United States Patent [19]

Dahms

[11] 4,417,915
[45] Nov. 29, 1983

[54] GLASSWARE FORMING APPARATUS

[75] Inventor: Francis A. Dahms, Tariffville, Conn.

[73] Assignee: Emhart Industries, Inc., Farmington, Conn.

[21] Appl. No.: 375,834

[22] Filed: May 7, 1982

Related U.S. Application Data

[62] Division of Ser. No. 179,381, Aug. 18, 1980, Pat. No. 4,339,264.

[51] Int. Cl.³ .............................................. C03B 7/16
[52] U.S. Cl. ....................................... 65/159; 65/238; 65/225; 65/304
[58] Field of Search ................... 65/159, 225, 238, 304

[56] References Cited

U.S. PATENT DOCUMENTS 3,142,553  7/1964  Cook ....................................... 65/304
3,592,624  7/1971  Dahms .................................... 65/304

Primary Examiner—Arthur D. Kellogg
Attorney, Agent, or Firm—H. Samuel Kieser

[57] ABSTRACT

A delivery system for use for delivering gobs of glass from a plurality of feeder orifices to a plurality of sets of a plurality of blank molds. The blank mold sets are rotated about a central axis with each blank mold of each set being positioned a different radial distance from the axis. The delivery system includes individual gob guiding units each having a lower end positioned over its associated blank mold as each set of blank molds are rotated underneath. The lower end of each unit is moved at a different relative tangential velocity to match the different relative tangential velocity of its associated blank mold. The scoops of the gob guiding units are independently moveable into and out of their feeding positions.

5 Claims, 36 Drawing Figures

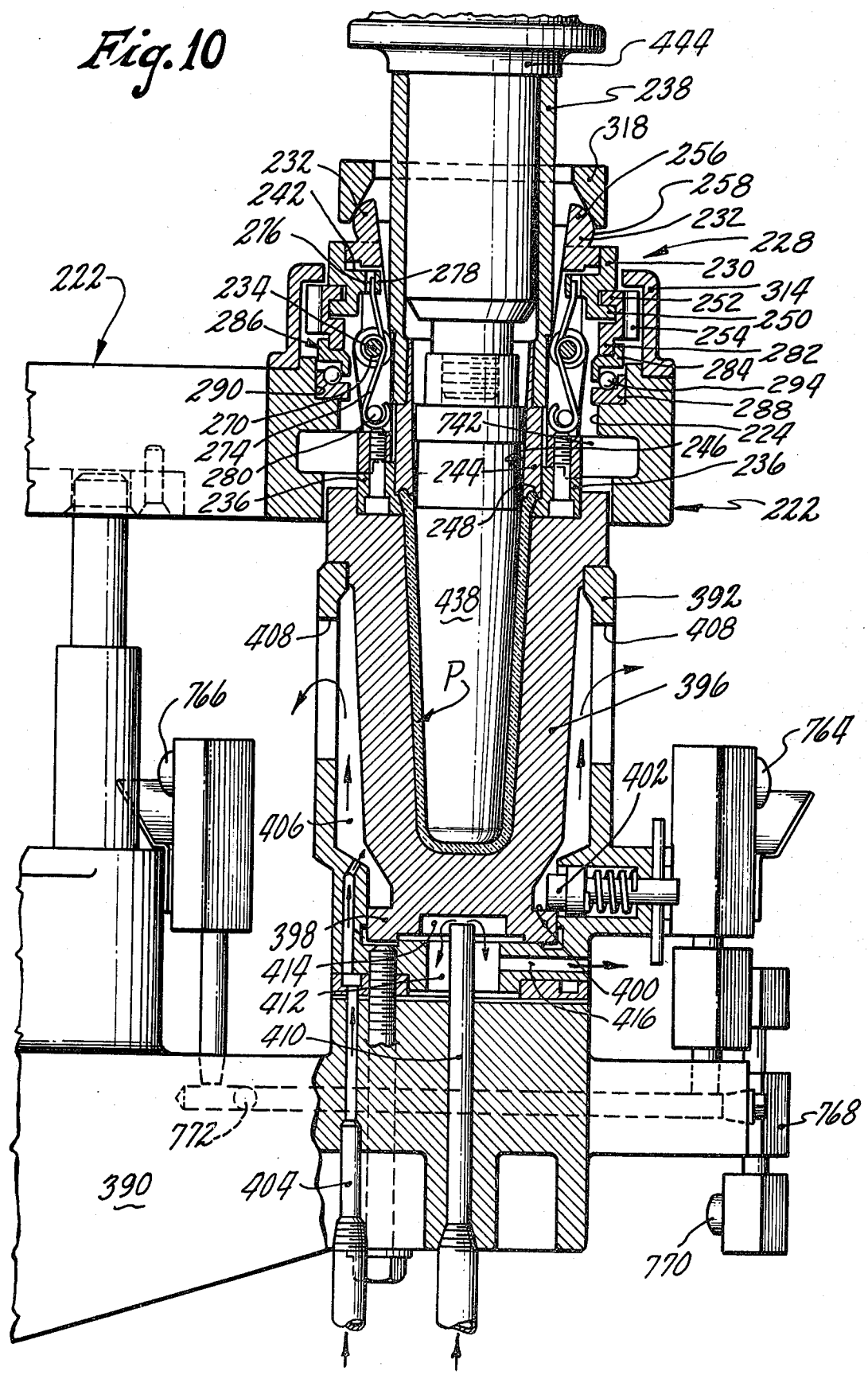

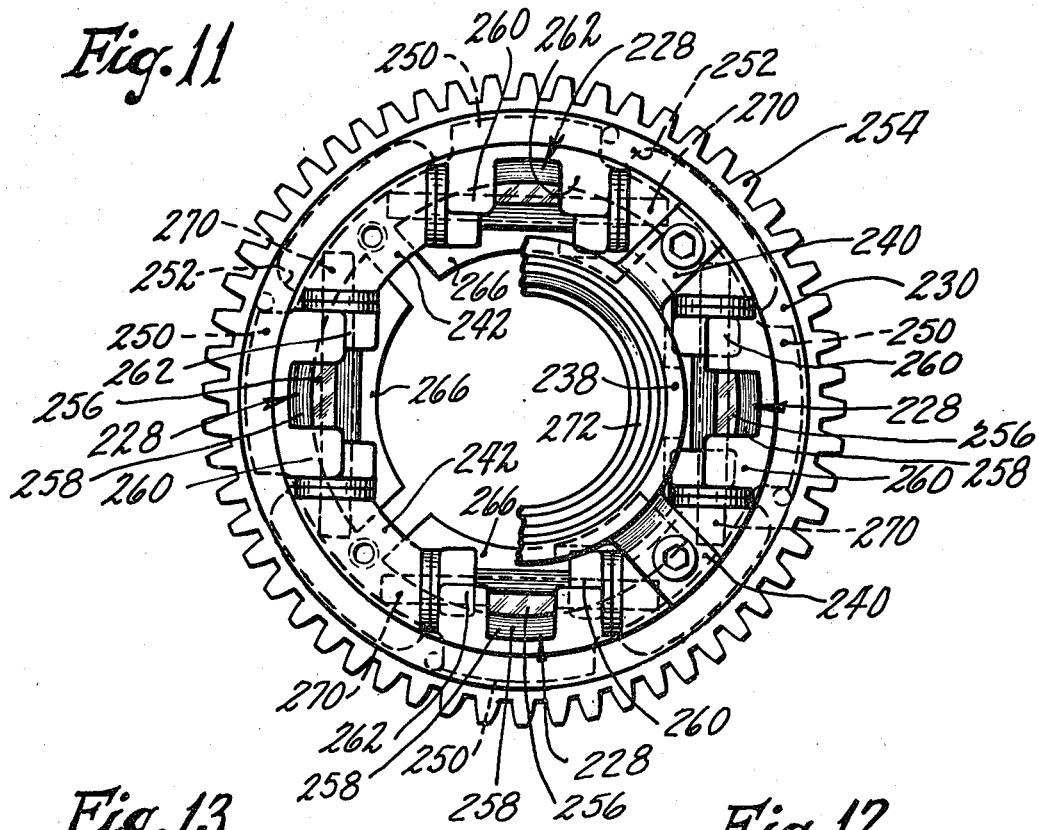
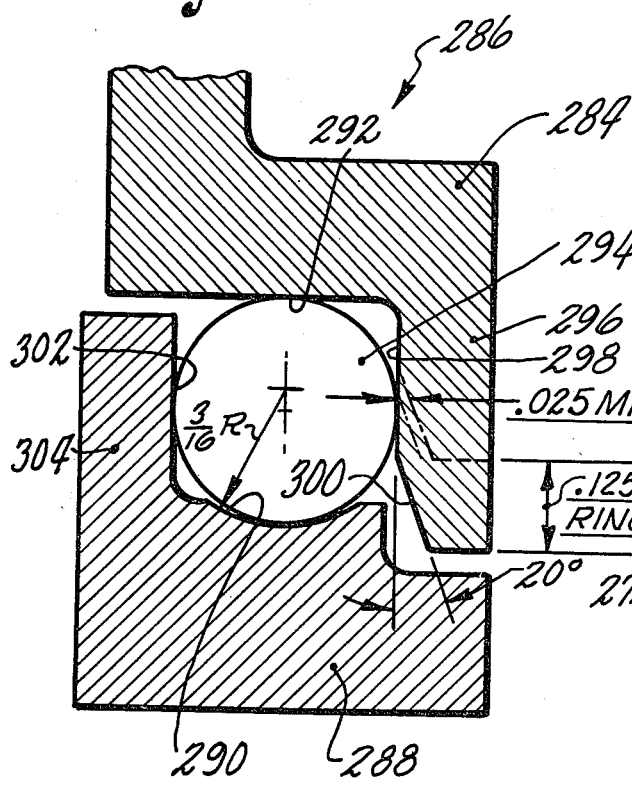
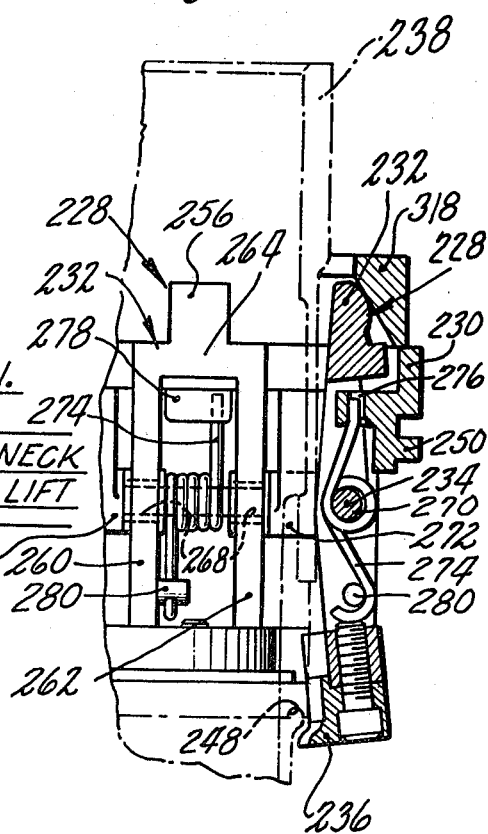

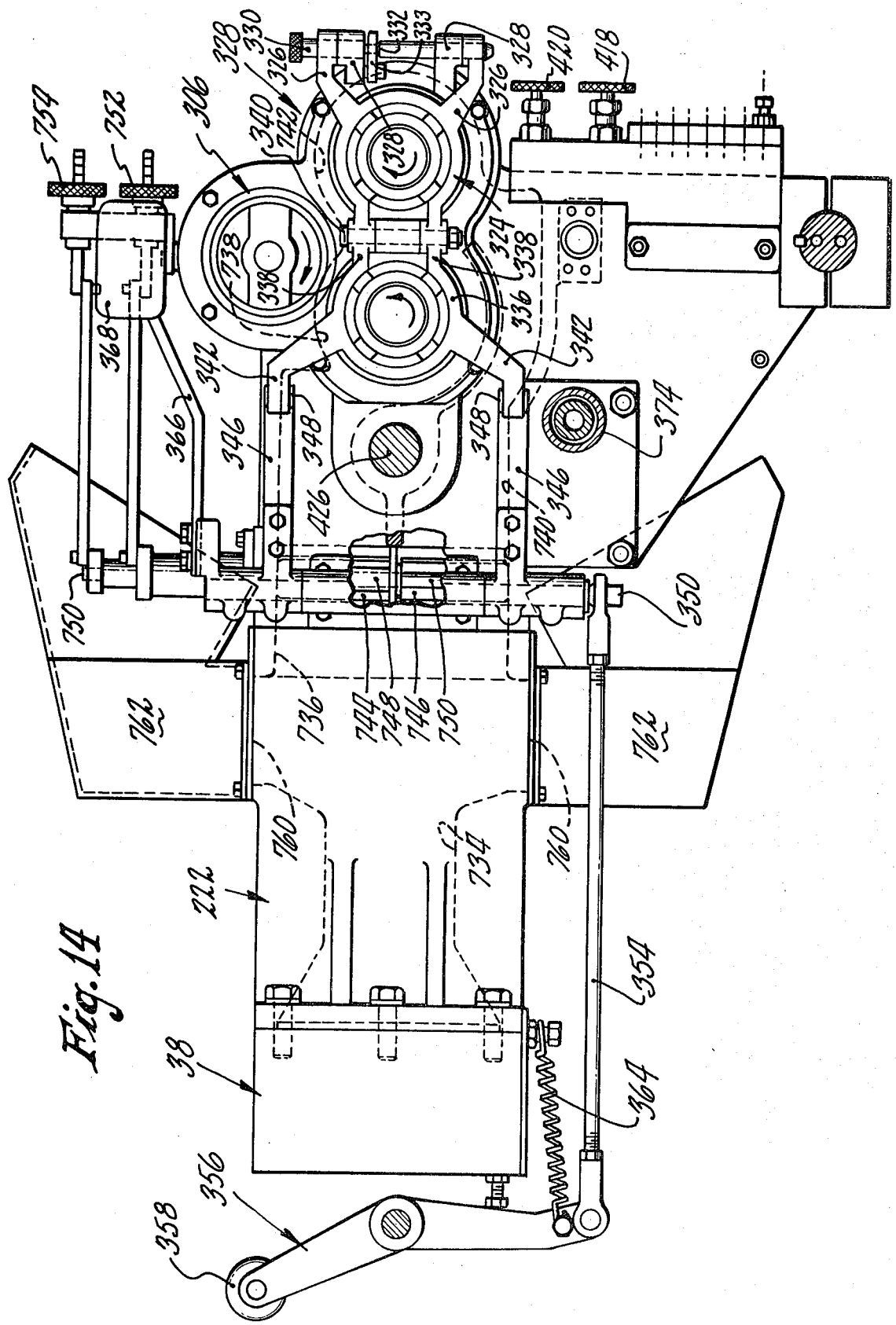

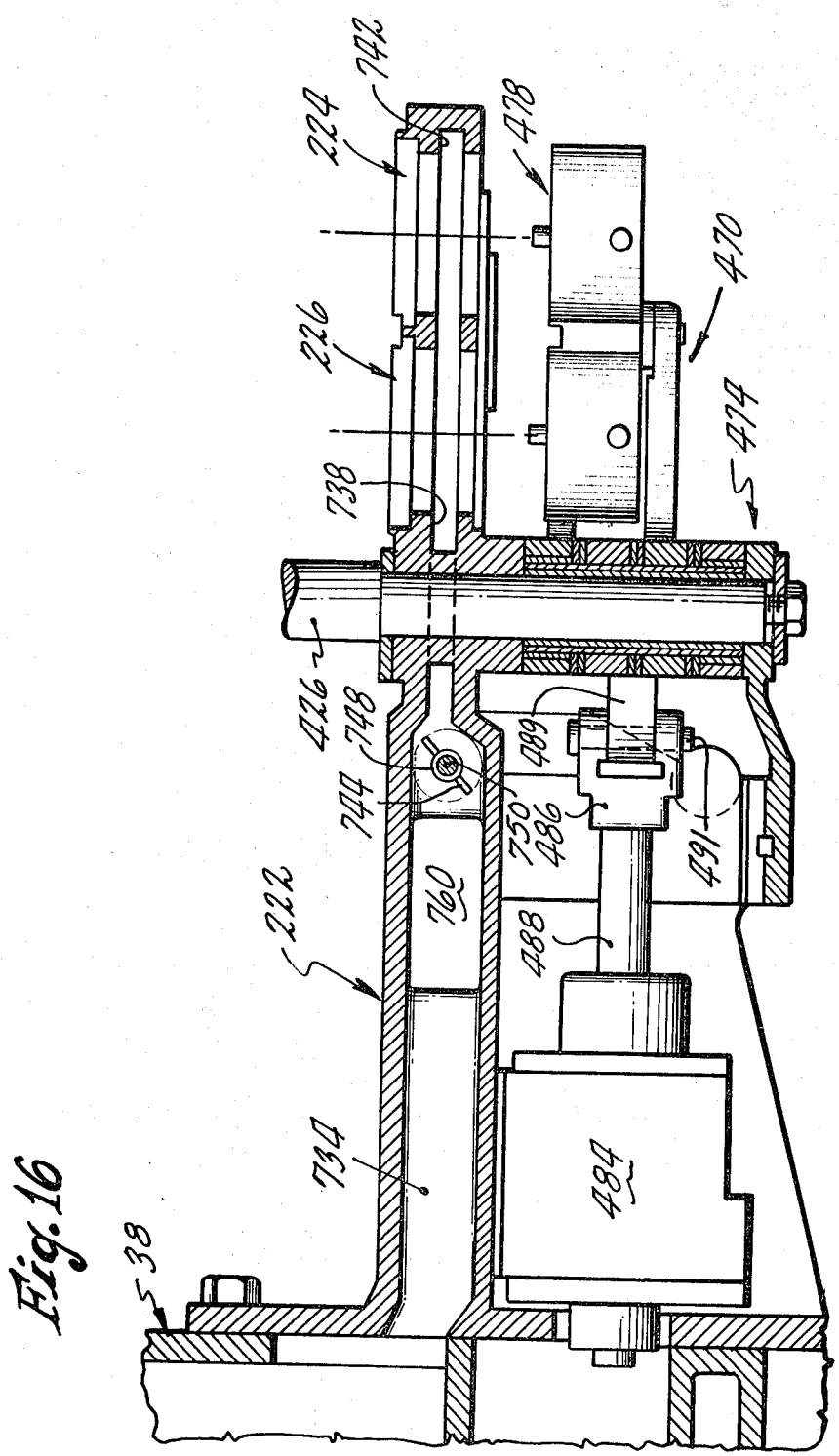

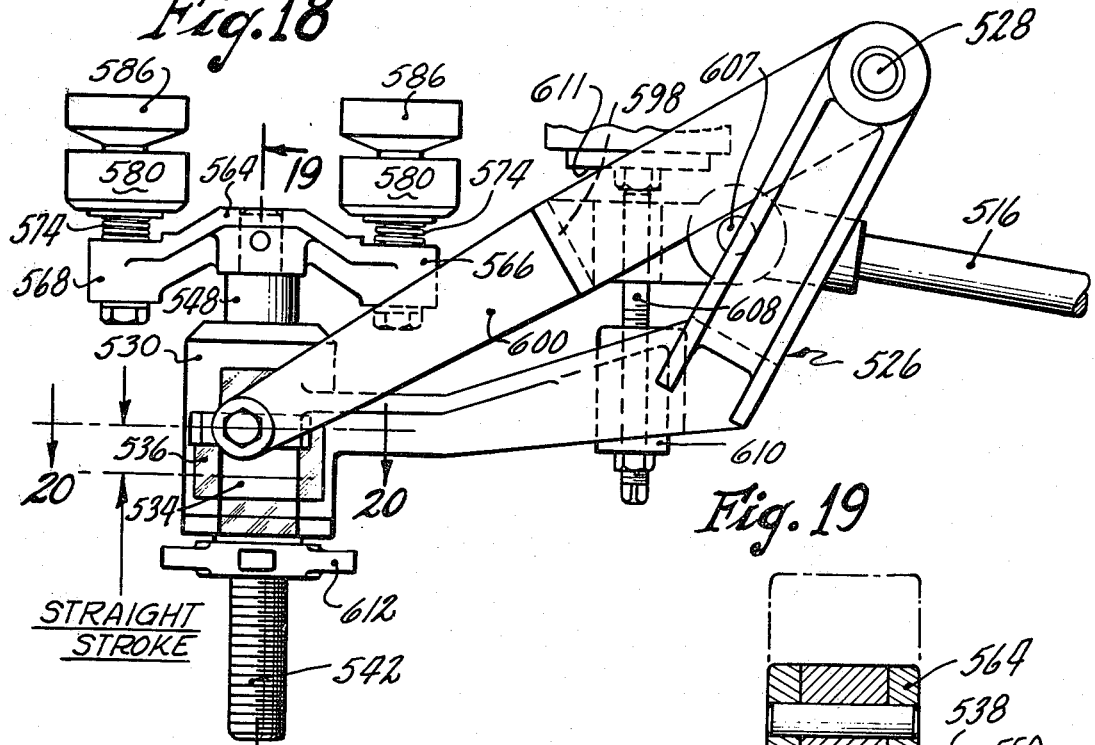
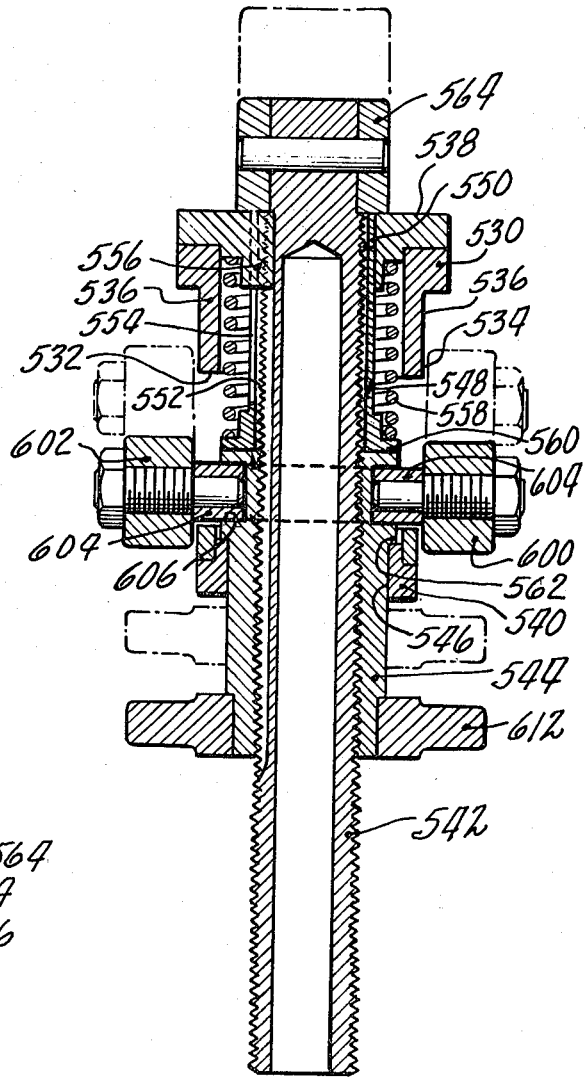
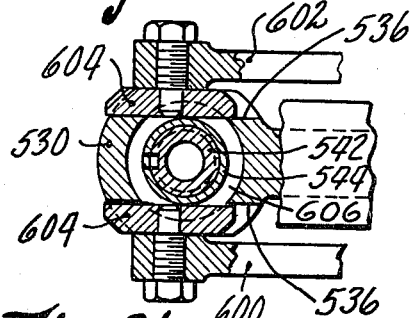
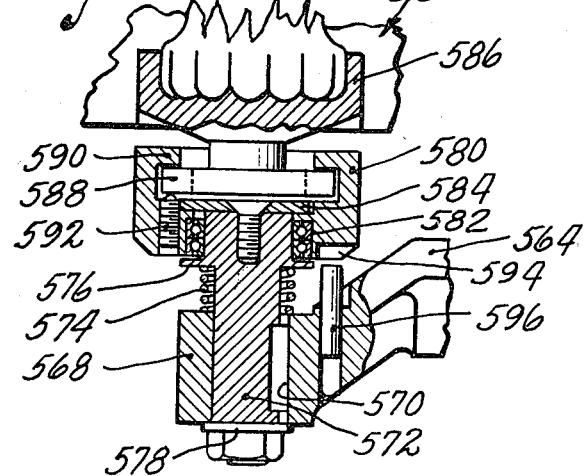

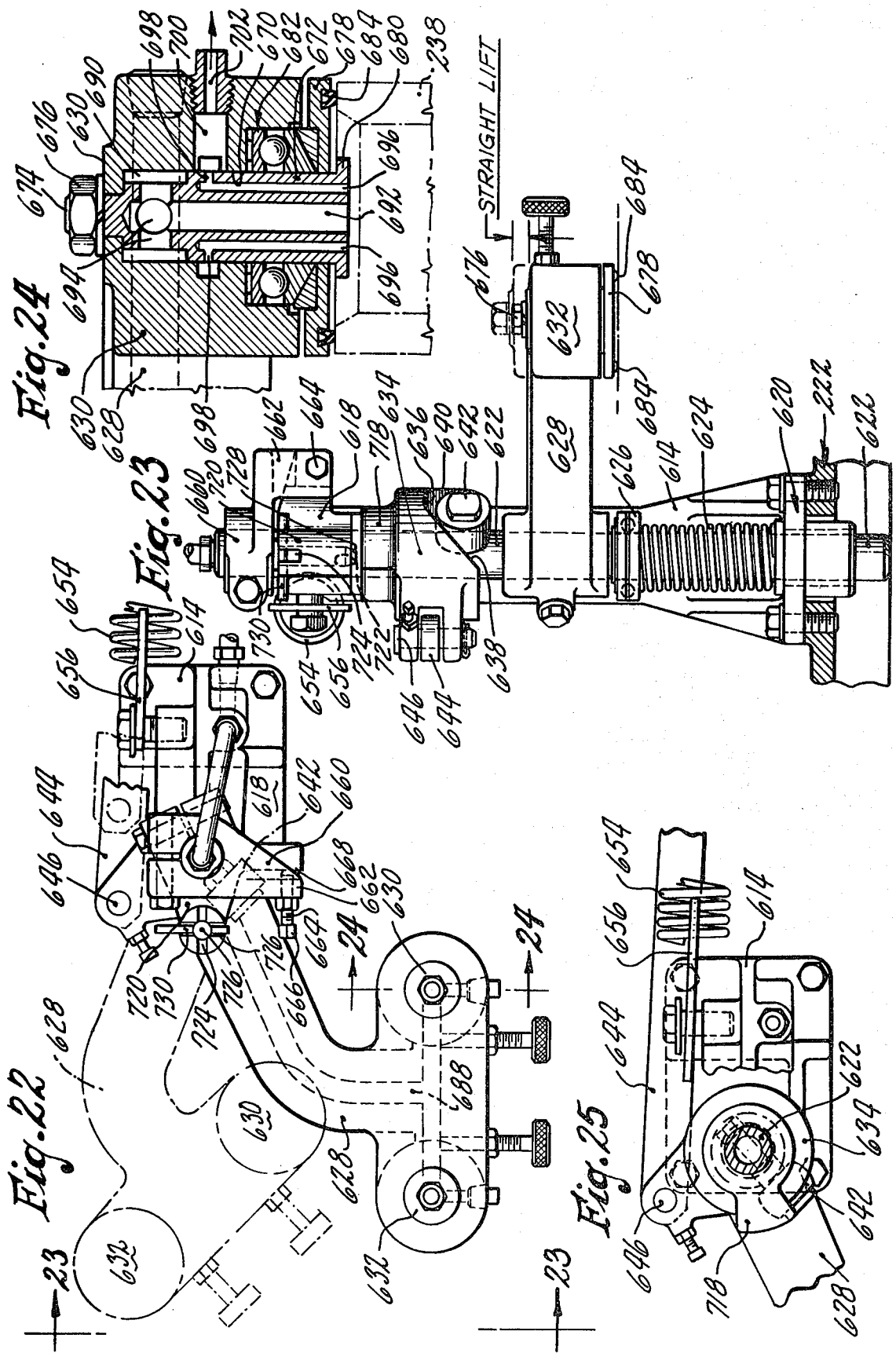

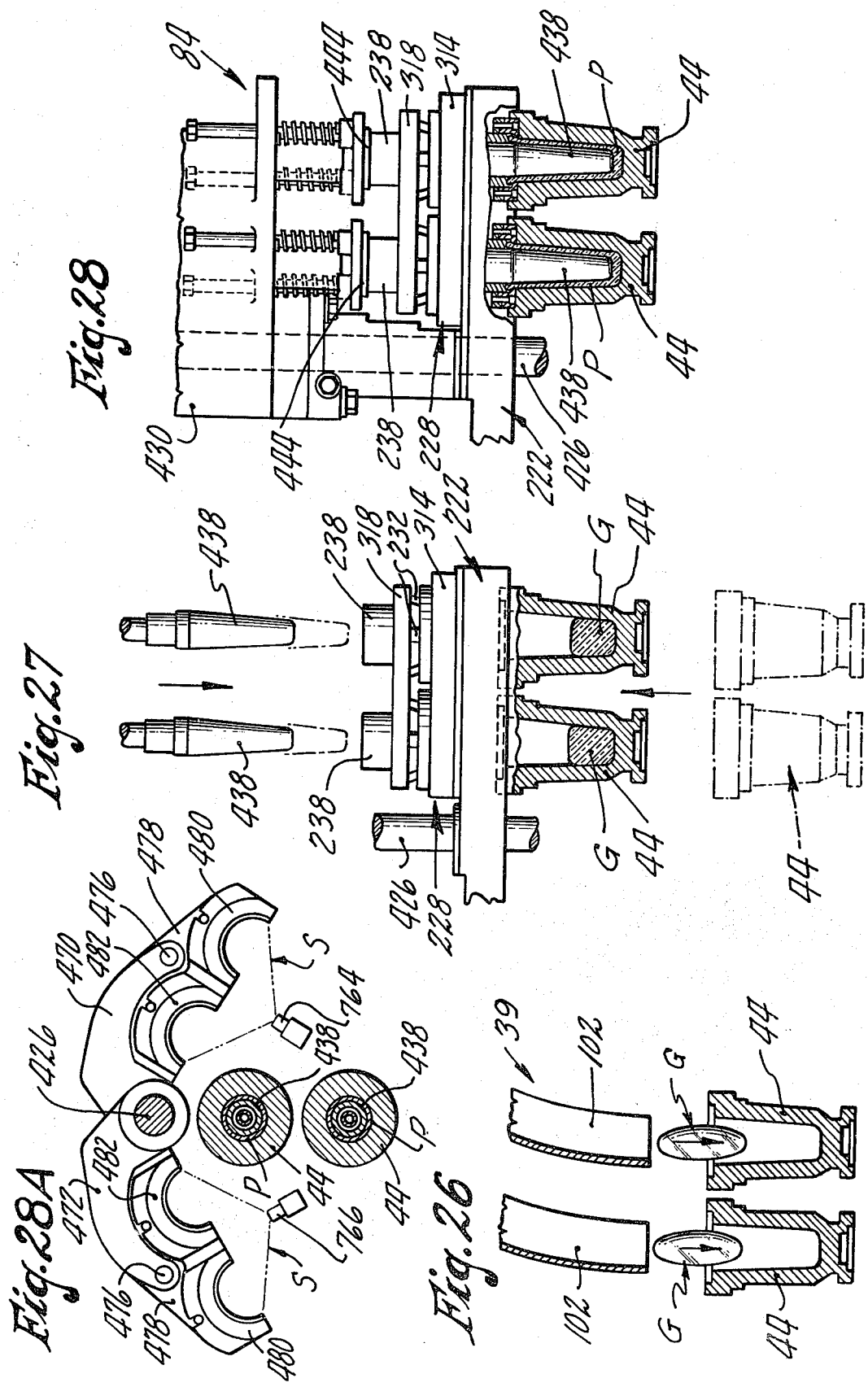

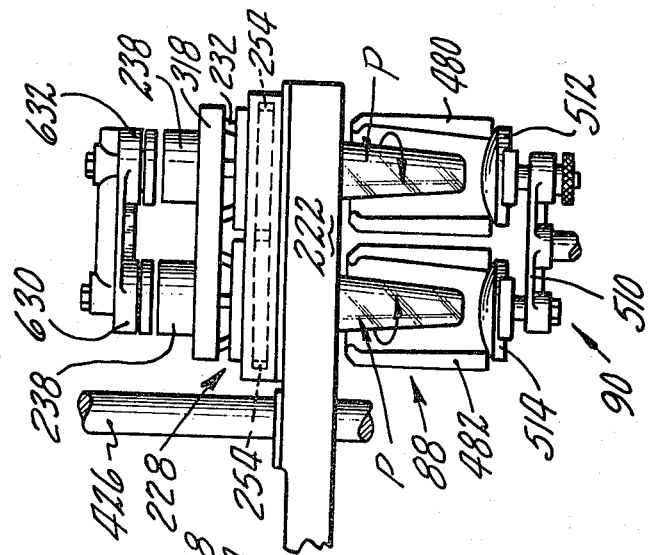
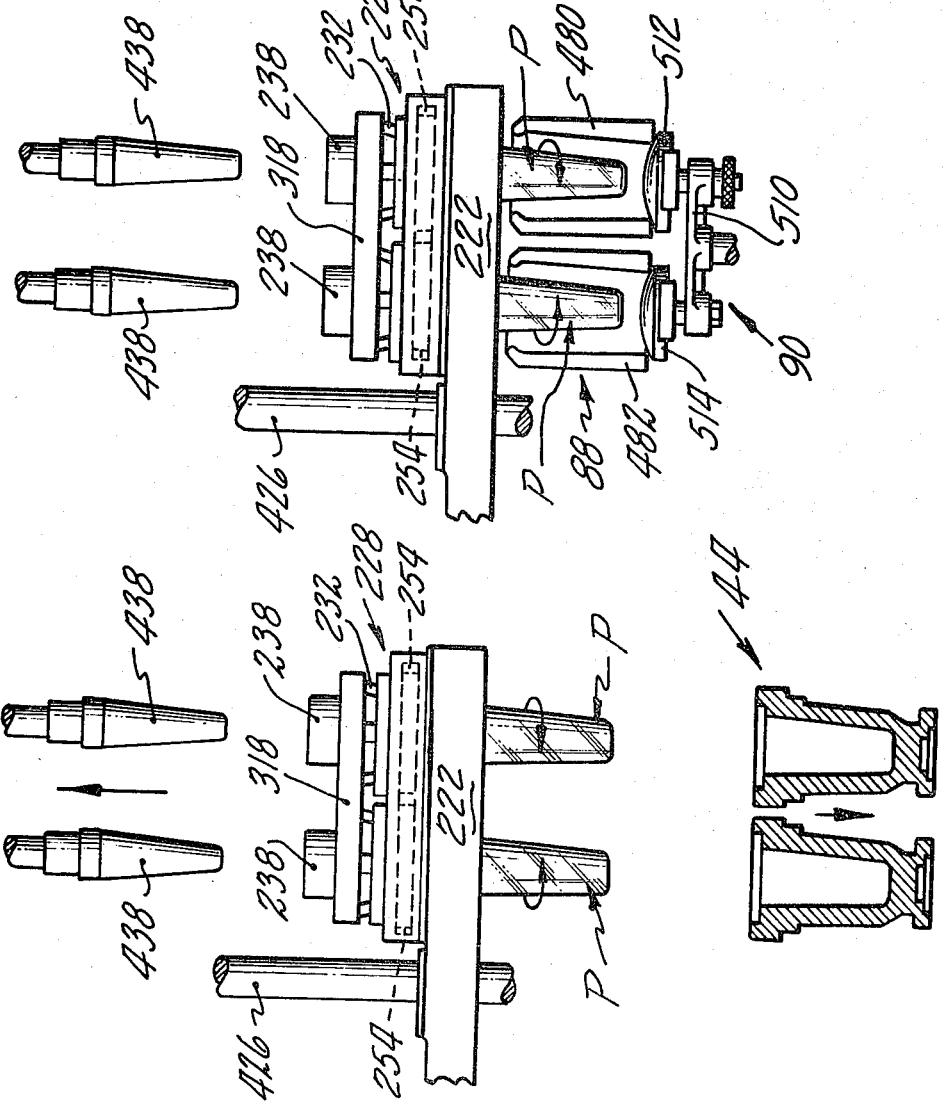

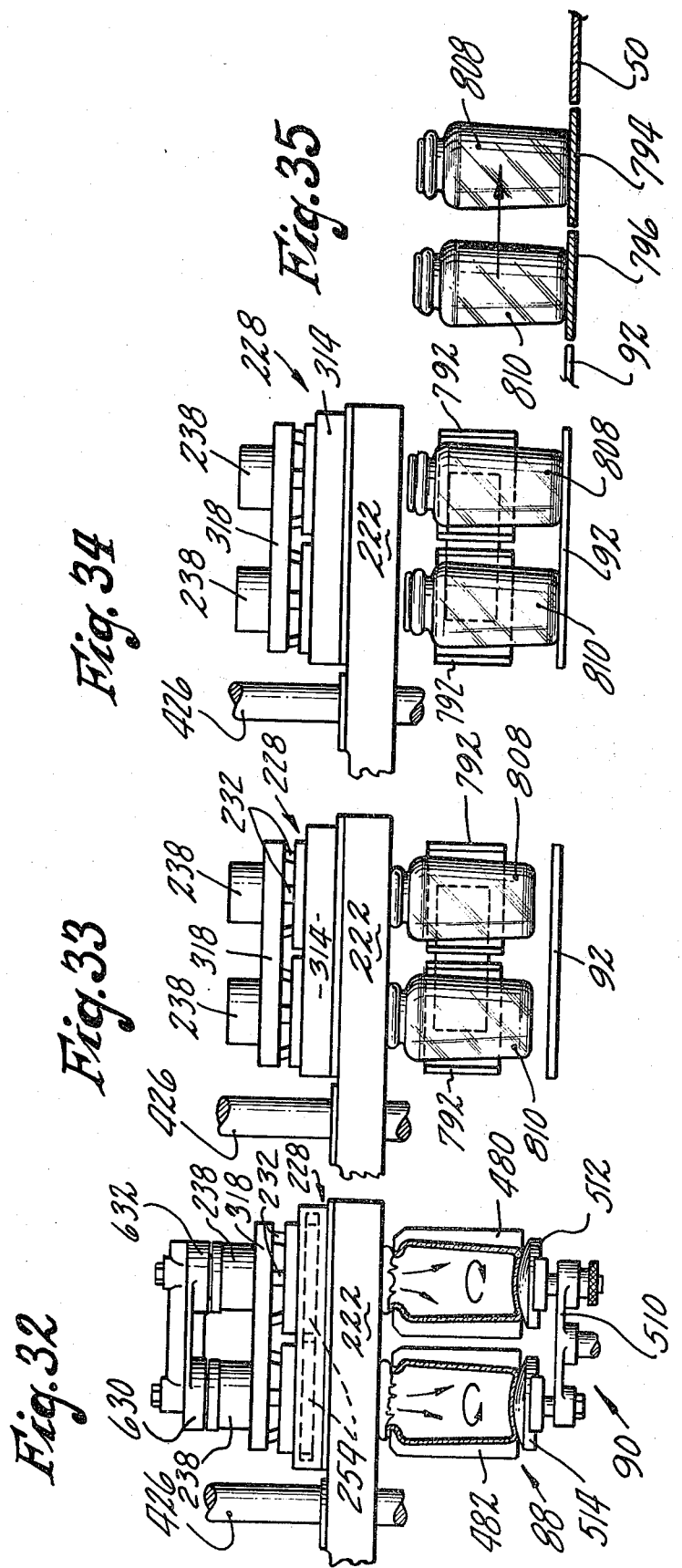

GLASSWARE FORMING APPARATUS

This application is a division, of application Ser. No. 179,381 filed Aug. 18, 1980 now U.S. Pat. No. 4,339,264.

BACKGROUND OF THE INVENTION

This invention relates to a glass forming machine of the press and blow type in which a parison is first pressed in a blank mold by a pressing plunger and the parison is then subsequently blown to its final shape in a blow mold, and to auxiliary equipment for use with such machine. This type of machine is shown in U.S. Pat. No. 1,979,211 which issued on Oct. 30, 1934 to G. E. Rowe. This patent is hereby incorporated by reference in this disclosure in its entirety. A machine which is commonly used in the glass industry today and which substantially embodies the structure shown in this patent is known as the "Emhart H-28 Machine." This type of machine is a single table, continuous rotary motion machine having a plurality of individual foaming units mounted for rotation about the axis of the machine. These machines have been available with different numbers of individual forming units such as 6, 12 or 18 sections. Each individual forming unit produces one glassware article for each complete revolution or cycle of the machine.

SUMMARY OF THE INVENTION

As mentioned above, the glassware forming machine of the type shown in the U.S. Pat. No. 1,979,211 produces only one glassware article per section for each revolution or cycle of the machine. An important feature of this invention is the provision of a machine of the rotary table type which is capable of producing a plurality of articles per individual forming unit per single rotation or cycle of the machine. Accordingly, the machine of the present invention utilizes a plurality of individual forming units each of which has a plurality of blank molds and blow molds whereby a plurality of glassware articles may be made in a single unit during a cycle.

Additionally, the machine of the present invention incorporates various improvements over the H-28 machine. More specifically, the machine incorporates an improved neck ring structure, a neck ring quick disconnect, a unique rotating bottom plate structure, unique blow mold spraying, an improved blow head operating mechanism and an improved structural arrangement. Further, the delivery system for delivering gobs of glass to the blank molds of an individual forming unit has novel characteristics as well as the takeout mechanism and transfer mechanism.

DESCRIPTION OF THE DRAWINGS

The various novel features of the present invention will be more readily understood by reference to the following description and the accompanying drawings in which:

FIG. 10 is a sectional view taken along the lines 10—10 of FIG. 9 with the neck ring included.

FIG. 11 is a plan view of the neck ring assembly and neck ring driving gear.

FIG. 12 is a sectional view taken along the lines 12—12 of FIG. 11.

FIG. 13 is an enlarged cross-sectional view of the bearing supporting the neck ring assembly.

FIG. 14 is a partial plan view of an individual forming unit with the blank molds in their up position.

FIG. 16 is a sectional view through the neck ring arm of an individual forming unit.

FIG. 18 is an elevational view of an alternative embodiment of a bottom plate to be used with the blow molds.

FIG. 19 is a sectional view taken along the lines 19—19 of FIG. 18.

FIG. 20 is a partial sectional view taken along the lines 20—20 of FIG. 18.

FIG. 21 is an enlarged sectional view of a portion of the bottom plate.

FIG. 22 is a plan view of the blow head mechanism of the present invention.

FIG. 23 is an elevational view taken along the lines 23—23 of FIG. 22.

FIG. 24 is a sectional view taken along the lines 24—24 of FIG. 22.

FIG. 25 is a partial plan view of the blow head mechanism partially broken away to reveal the detailed construction of the cam and cam follower.

FIGS. 26-28, 28A, 29-35 are schematic diagrams illustrating in sequence the movement of the various components of the individual forming machine and the operation thereof.

DETAILED DESCRIPTION

I. GENERAL MACHINE STRUCTURE

Figure 1:
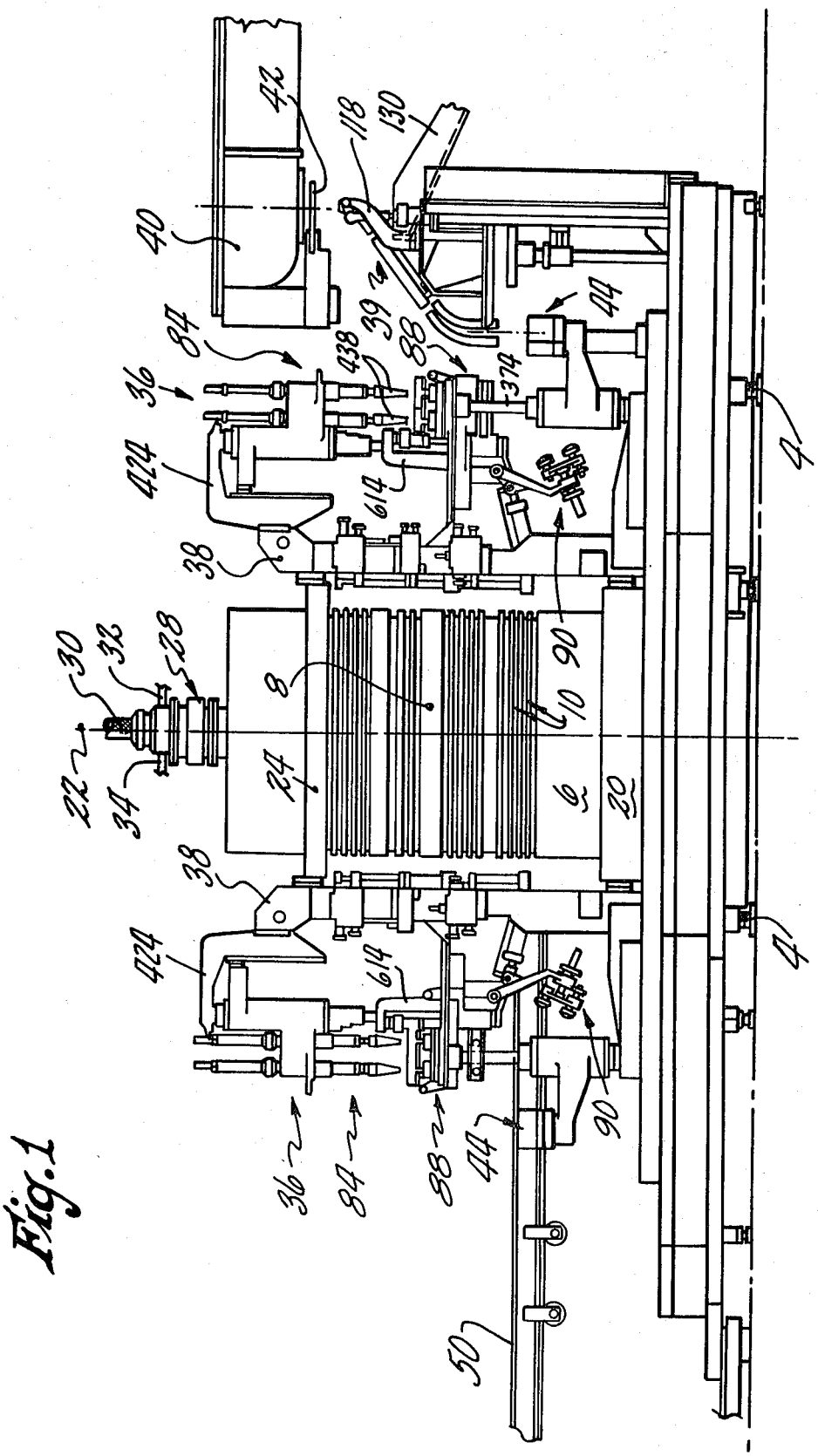
FIG. 1 is a schematic elevational view showing the machine and delivery system of the present invention with only two of the individual forming units shown.
Figure 2:
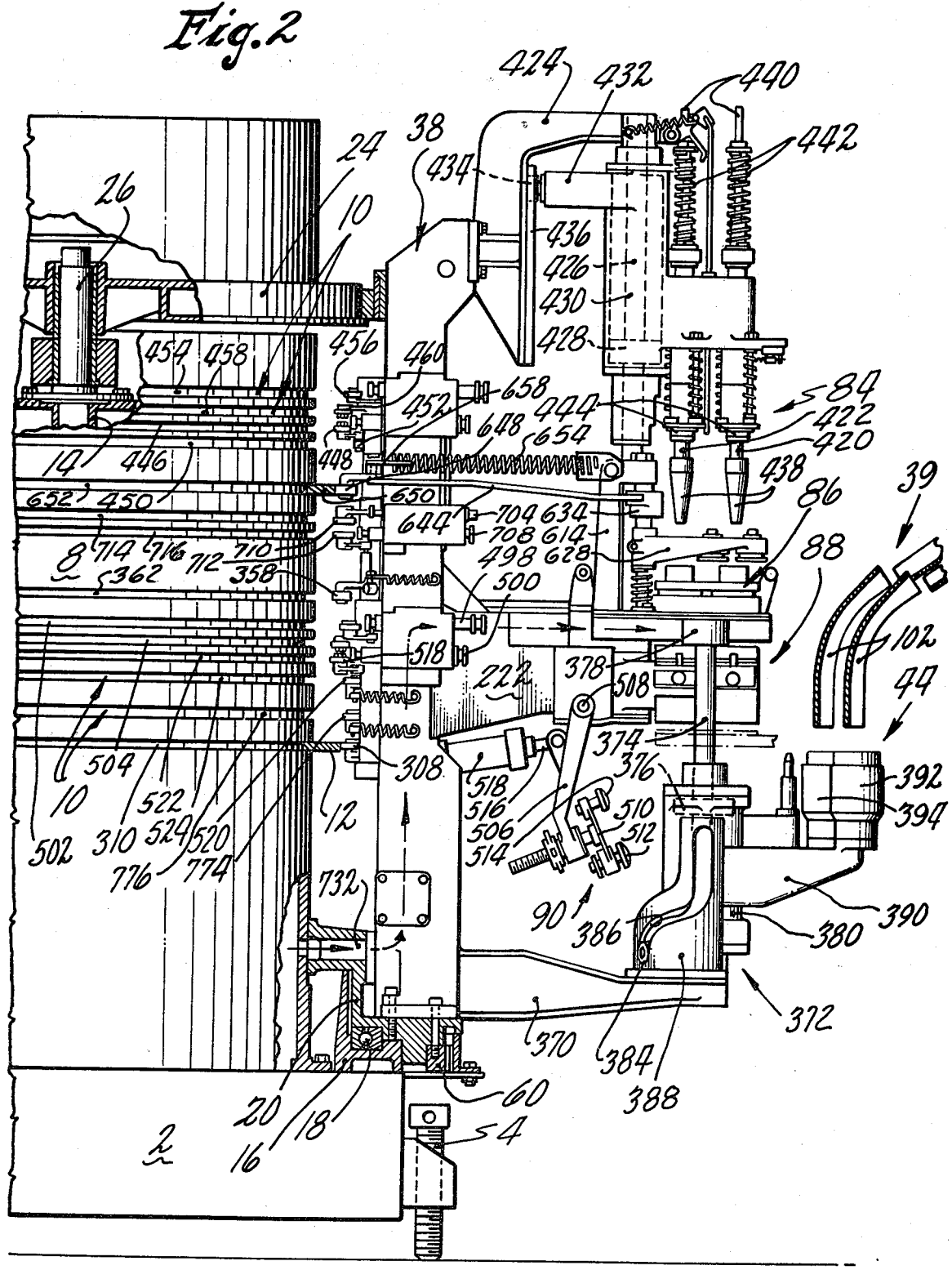
FIG. 2 is an enlarged schematic elevational view showing the various components of an individual forming unit of the machine of the present invention.

Referring to the drawings and in particular FIGS. 1 and 2, the machine generally includes a base member 2 which may be provided with suitably leveling screws 4. Mounted upon the base member 2 is a stationary cam drum base member 6 which forms a chamber to which cooling wind may be admitted for a purpose to be described. Positioned above the cam drum base member 6 and suitable secured thereto is a stationary cylindrical cam drum 8 having a plurality of circumferentially extending, horizontally spaced, cam receiving grooves indicated generally by the number 10 in which may be secured cam members 12 at the desired positions. An upwardly extending stationary column 14 extends through the central portion of the base member 6 and cam drum 8.

About the cam drum base member 6 and mounted on the base member 2 is a stationary bearing structure 16, annular in form and adapted to support a bearing 18 positioned between it and a lower turret ring 20. The lower turret ring 20 is rotatable about the machine axis 22. An upper turret ring 24 is mounted for rotation about a bearing portion 26 at the upper end of the column 14 above the cam drum 8. Above the stationary column 14 and the upper turret ring 24 is a fluid distributing device 28. This may be of the type conventional with machines of this type and may include an air inlet 30, a water inlet 32 and a lubricating oil inlet 34.

A plurality of individual forming units 36 have their main upright frame members 38 attached at their upper end to the upper turret ring 24 and at their lower end to the lower turret ring 20. Each of the individual forming units 36 include suitable forming mechanisms for completely forming articles of the desired type. Although, according to the preferred embodiment, there is shown in FIGS. 3 and 4 twelve of these individual forming units 36, it is to be understood that other multiples may be provided, as for example, six or eighteen of such units.

A delivery system 39 is provided for feeding gobs of glass from a feeder mechanism 40 including a shears 42 to cut the gobs to the plurality of blank molds 44 of each individual forming unit 36. According to the preferred embodiment, each individual forming unit 36 is adapted to receive two gobs of glass at one time in two blank molds and thus form two glass articles simultaneously. It is to be understood however, that more than two gobs may be fed simultaneously as for example, three, and in such case three blank molds would be provided in each individual forming unit.

Figure 3:
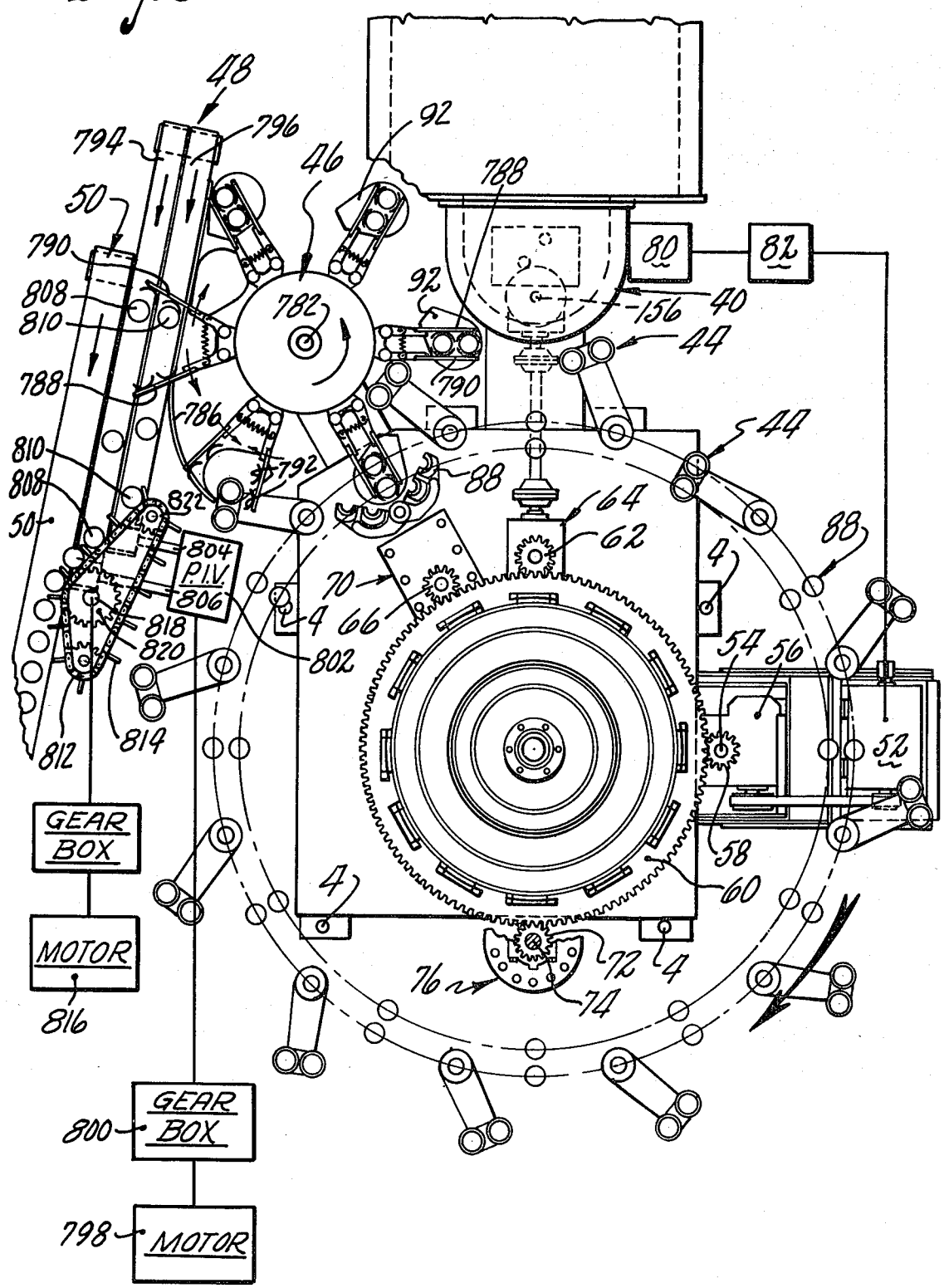
FIG. 3 is a diagrammatic plan view showing the relationship of various components of the machine, the takeout and the transfer mechanism of the present invention.
Figure 4:
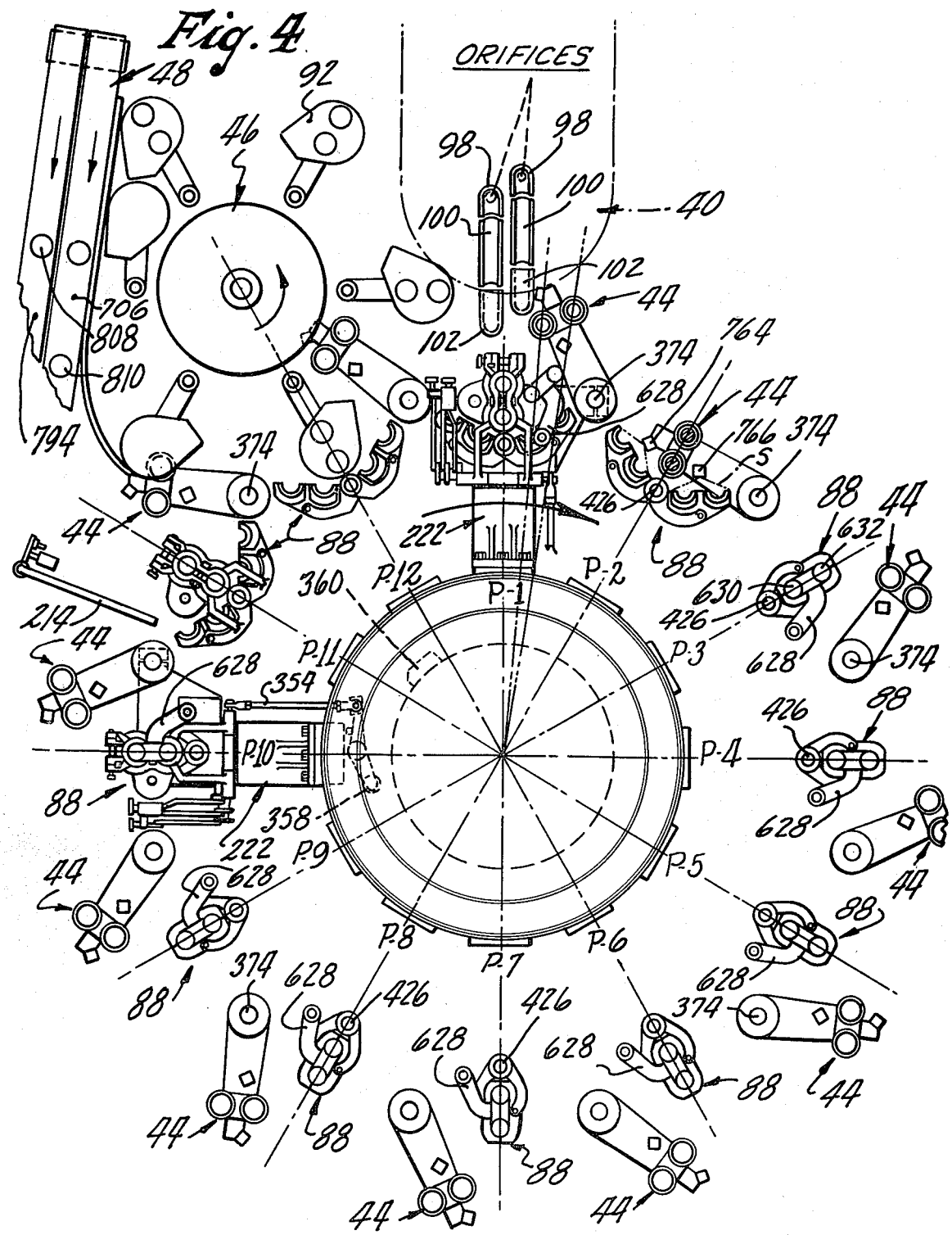
FIG. 4 is a diagrammatic plan view showing the relationship of various components of the machine as the machine rotates about its axis.

A takeout mechanism 46 is provided as shown in FIG. 3 to take the blown glass articles from the individual forming units 36 and deposit them on a transfer mechanism 48. The transfer mechanism 48 transfers the articles from the takeout mechanism to a takeaway conveyor 50 which transports the articles to a lehr (not shown) for annealing as is well known in the art.

Suitable driving means, as shown in FIG. 3, is provided for imparting continuous rotation to the turret rings 20 and 24 and the attached forming units 36, and for driving the delivery system 39 and the takeout mechanism 46 in synchronism with the machine. The driving means may include a suitable prime mover 52 such as a motor or the like which is connected to an output shaft 54 through a gear reducer 56. The output shaft extends vertically upwardly and has mounted thereon a pinion 58. The pinion 58 meshes with a ring gear 60 which is attached to the lower turret ring 20. The ring gear 60 in turn drives other pinions to provide the drive for other mechanisms. A delivery pinion 62, in meshing engagement with the ring gear 60, is connected through a series of shafts and bevel gear boxes indicated generally by the numeral 64 to the delivery mechanism 39. Similarly, a takeout drive pinion 66 is connected through a series of shafts and bevel gear boxes indicated generally by 70 to the takeout mechanism 46. Another pinion 72 is attached by a suitable shaft 74 to a stop and brake mechanism 76. The feeder and shears are run by their own synchronous motor 80 which is electrically phased with the motor 52 driving the ring gear 60 by means of an electrical differential 82.

Generally, each individual forming unit 36 includes a plurality of blank molds 44 for receiving gobs of glass from the delivery mechanism 39 simultaneously. A press head 84 having plungers equal in number to the number of blank molds 44 is provided for pressing the gobs of glass into the parisons in the blank molds as the forming unit 36 rotates around the axis of the machine. A plurality of neck rings 86 are included to hold the articles during processing. A plurality of blow molds 88, equal in number to the number of blank molds 44 with a bottom plate 90 for closing the blow molds 88 to form a cavity wherein the parison is blown in its final shape. The finally blown articles are deposited on a dead plate 92 of the takeout mechanism 46 and are then deposited onto the takeaway conveyor mechanism 50 by means of the transfer mechanism 48.

II. DELIVERY MECHANISM

Figure 5:
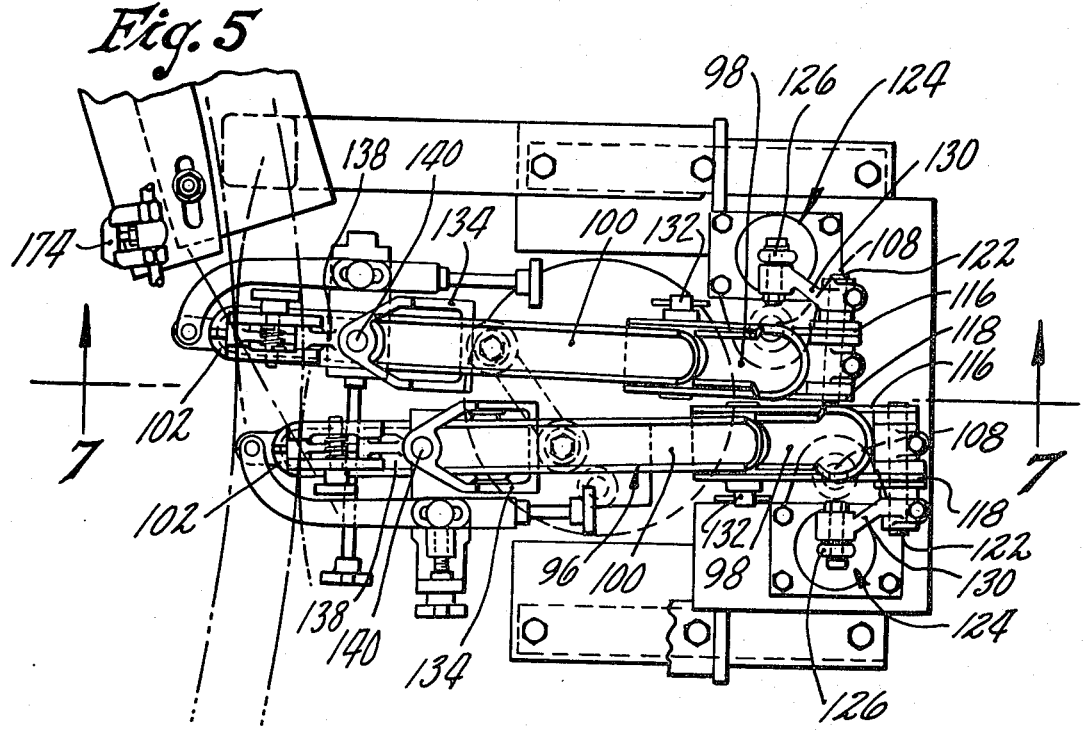
FIG. 5 is a plan view of the delivery system of the present invention.
Figure 6:
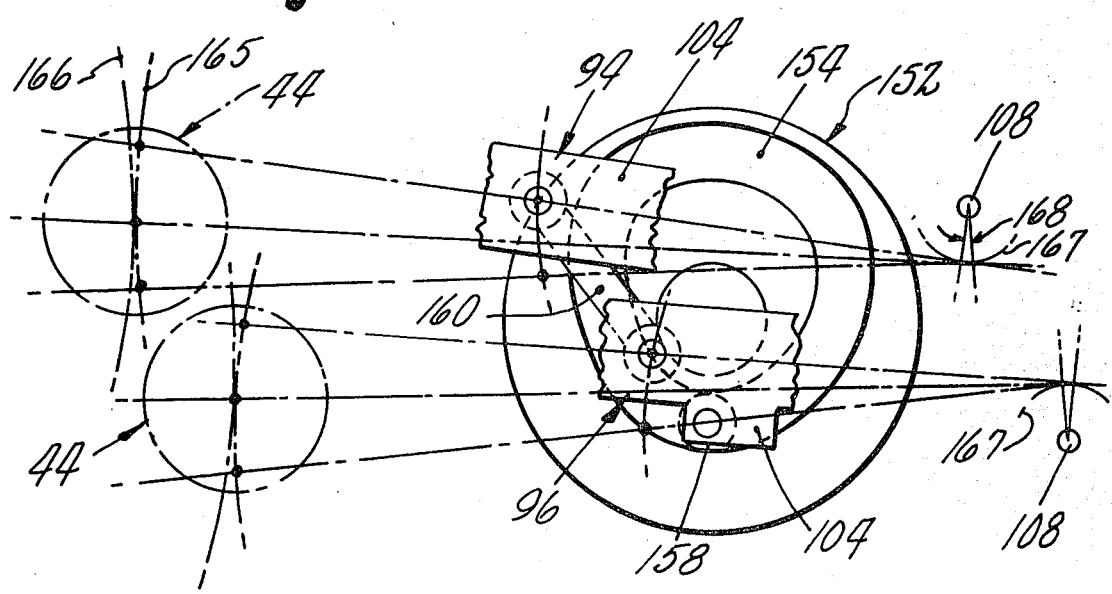
FIG. 6 is a schematic view showing the relationship of various components of the delivery system in relation to the blank molds.
Figure 7:
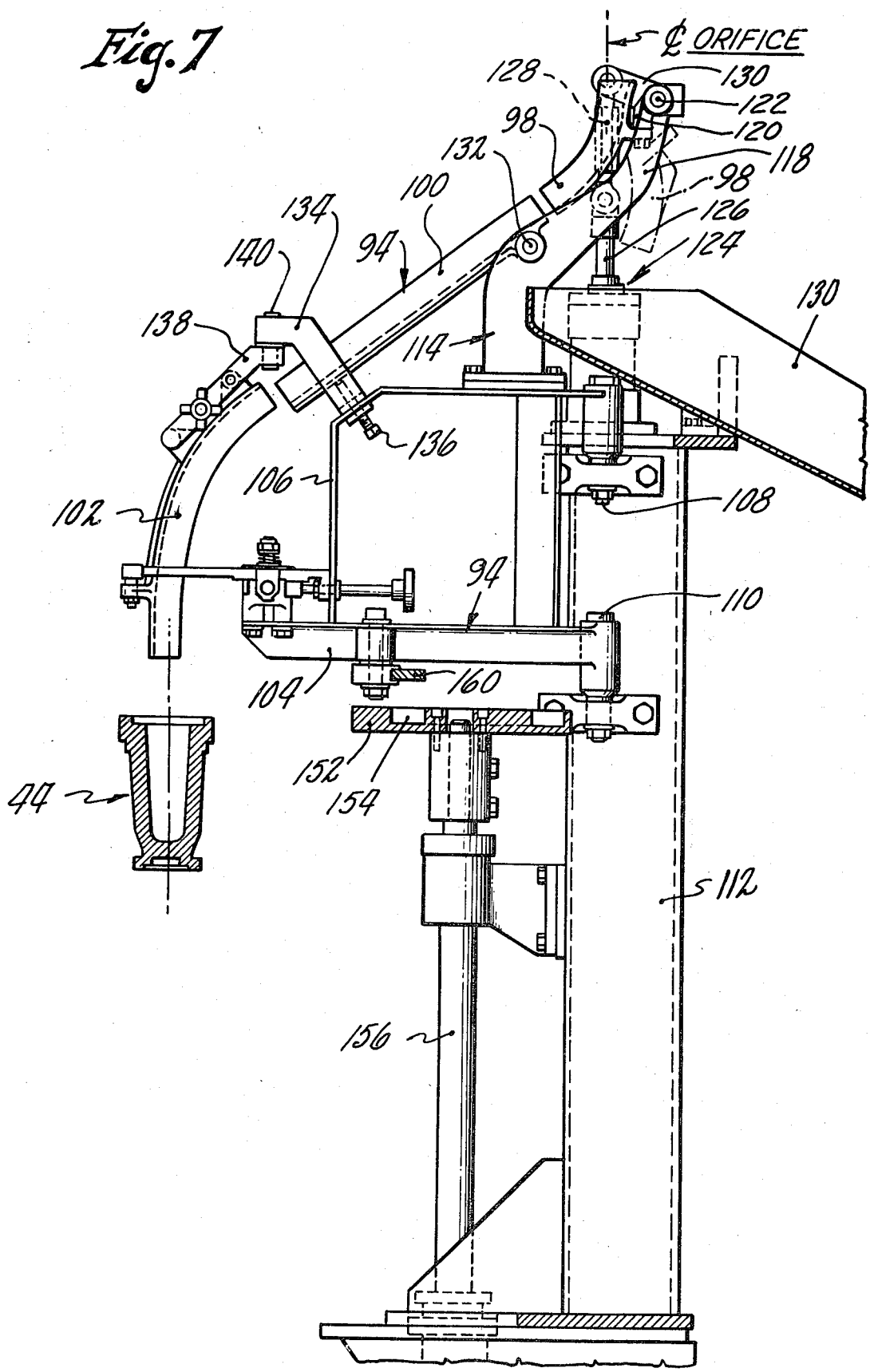
FIG. 7 is a partial sectional view of the delivery system taken along the line 7—7 of FIG. 5.

The delivery mechanism 39 is shown in detail in FIGS. 5-7 of the drawings. To feed a gob from each of the plurality of orifices of the feeder 40 to each of the plurality of blank molds 44, there is provided a plurality of gob guiding units 94 and 96, one associated with each feeder orifice. Each of the gob guiding units 94 and 96 comprises a scoop 98, a trough 100 and a deflector 102. The scoops 98 receive a gob from the feeder 40, and direct it to the downwardly extending straight trough 100 after which the deflector 102 deflects the gob into one of the blank molds 44 as the molds are rotating about the machine axis 220. In accordance with the preferred embodiment of the invention, there are two such gob guiding units 94 and 96, one for each of the two blank molds 44 of the forming units 36. In the event the forming units 36 utilized more than two blank molds 44, additional guiding units would be provided.

Each of the gob guiding units 94 and 96 is mounted on a delivery arm 104 having an upstanding bracket 106 thereon. Each delivery arm and bracket unit 104, 106 is pivotally attached at an upper pivot point 108 and a lower pivot point 110 having the same axis as the upper pivot point 108 to a frame member 112 extending upwardly under the feeder 40.

An upper bracket member 114 is attached to each of the brackets 106 and includes upwardly extending spaced side plate members 116 and 118. A scoop 98 is attached to an arm member 120 which is pivotally mounted at the upper end of each of the upper brackets 114 by means of a shaft 122 which is rotatable in the upper bracket member 114. Two piston and cylinder mechanisms 124 are mounted on the frame member 112 in a position horizontally offset with respect to the scoop member 98 with which it is associated. Each mechanism 124 includes a piston rod 126 extending upwardly and which is attached by a turnbuckle linkage 128 to a lever arm 130 which is in turn connected to the shaft 122. Both ends of each turnbuckle linkage 128 include ball joints to provide the necessary freedom of movement to permit the gob guiding units 94 and 96 to pivot about their pivot points 108, 110. The turnbuckle permits the lower end of a scoop 98 to be adjusted relative to the upper end of a trough 100. With reference to FIG. 7, it will be seen that upon actuation of the piston and cylinder mechanism 124 associated with either of the scoop members in a manner to move the piston rod downwardly, the scoop 98 will rotate about the shaft 122 in a counterclockwise direction into the phantom line position, and permit a gob to fall into the cullet chute 130 and thus interrupt feeding of the gob to a blank mold. As each scoop 98 can be disabled by its associated piston and cylinder mechanism individually, it is possible to have either one of the scoops rendered inoperative or both rendered inoperative as will be explained in detail below.

Each trough member 100 has its upper end pivotally mounted on a pivot shaft 132 attached to an intermediate portion of the side plates 114, 116 with its lower end extending through a rectangular bracket member 134. An adjusting screw 136 extends up through the bracket 136 into engagement with the bottom surface of a trough 100 to provide a means for raising and lowering the bottom end of the trough by pivoting it about the pivot point 132 and adjusting the bottom end of the trough 94 with respect to the deflector 102.

Each deflector 102 is mounted on an arm 138 having its upper end pivotally attached by a vertical pivot shaft 140 to the bracket 134, an adjusting mechanism being attached to its lower end surface to permit the lower end of the deflector to be arcuately moved around the axis.

The two gob guiding units 94 and 96 are adapted to be oscillated about their respective pivot points 108 by means of a flat cam member 152 having a cam track 154 in its upper surface. The cam member 152 is adapted to be continuously rotated by virtue of its being mounted on a vertically extending shaft 156 which is connected to the delivery pinion 62 by means of the shaft and bevel gear boxes 64 shown in FIG. 3.

As shown in FIG. 6, a cam roller 158 is attached to the deflector arm of the gob guiding unit 96 and is positioned within the cam track 154 of the cam. The deflector arm 104 associated with the gob guiding unit 96 is interconnected to the deflector arm 104 of the gob guiding unit 94, by means of a control link 160 pivotally connected at its opposite ends of the respective arms 104. Referring to FIG. 3, the two blank molds when they are in their outer position, have their vertical axis on two different radii from the center of the machine and also, the length of each radius is different. The one with the larger radius is referred to as the outer blank mold and the one with the smaller radius is referred to as the inner blank mold. Thus, the inner blank mold has a lower tangential velocity than the outer blank mold, and, in a fixed period of time, the inner blank mold will travel a peripheral distance smaller than the peripheral distance traveled by the outer blank mold. Accordingly, by proper positioning of the control link pivot points on their respective bracket arms for a given spacing of the blank molds 44, the relative tangential velocity of the vertical axis 162 of the bottom end of each deflector 102 can be varied so that the gob guiding unit 94 serving the inner blank mold will travel a lesser peripheral distance for a given amount of time than the peripheral distance traveled by the vertical axis 162 of the gob guiding unit 96 serving the outer blank mold.

By offsetting the pivot points 108 of the gob guiding units 94 and 96 from the centerlines 164 of their respective orifices as shown in FIG. 6, the relation of movement of the axes 162 of the deflectors along the dashed line 165 is more nearly tangential to the movement of the axis of the blank molds along the dashed line 166. As the pivot points 108 are offset with respect to the orifice centerlines 164, the vertical axis of the top of each scoop 98 will travel along the dashed line 167. However, as the distance of offset is relatively small and the angle 168 through which the axis of each scoop 98 travels is small, it can be seen from FIG. 6 that the position of the axis of each scoop does not deviate significantly from being coaxial with the centerline of its respective orifice. In other words, for practical purposes, except when a scoop is in its locked-out position, or the unit is removed, each scoop is under its respective orifice at all other times.

Figure 8:
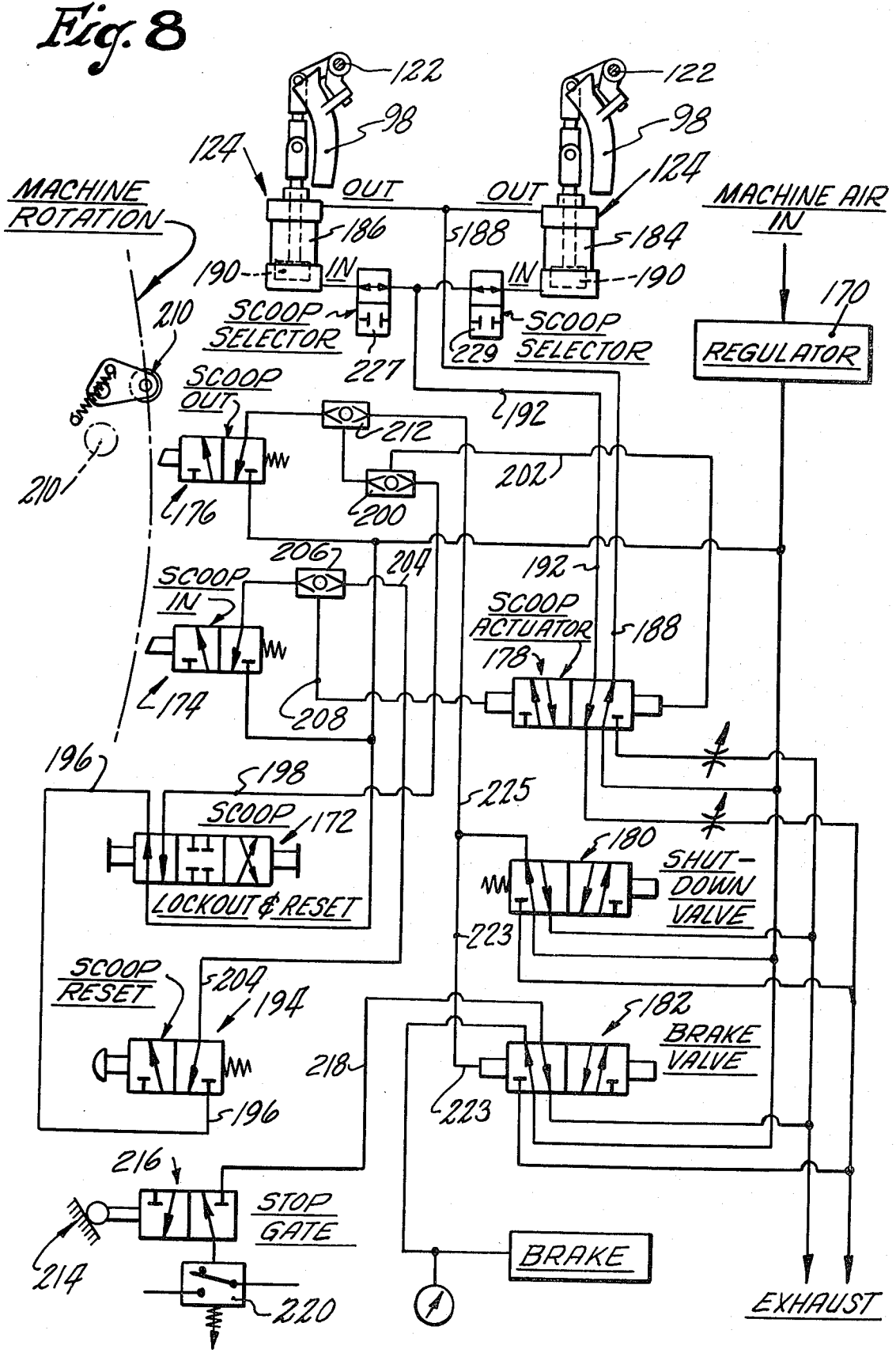
FIG. 8 is a schematic diagram of the pneumatic control system for moving the scoops between their in and out positions.

The control system for moving each of the scoops 98 between their in or feeding position and their out or disabled position is shown in FIG. 8. Machine operating air is fed through a pressure regulator 170 to a scoop lockout and reset valve 172, a scoop in valve 174, a scoop out valve 176, a scoop actuator value 178, a shut down valve 180 and a brake valve 182.

The scoop actuator valve 178 is used to control the flow of operating air to the scoop cylinders 184, 186 and is pilot operated by air to move it into its first or scoop-out position as shown in the drawing wherein machine air is fed through a suitable conduit 188 to the upper sides of each piston 190 of the piston and cylinder mechanism 124 of the individual scoops to move the piston 190 downwardly and move each scoop 98 into its out or disabled position. In this position of the scoop actuator valve 178, air from below the piston 190 passes through conduit 192 and through the scoop actuator valve 178 to be exhausted. Movement of the scoop actuator valve 178 into its second or scoop-in position connects the machine operating air with conduit 192 to feed machine air to the bottom side of each of the pistons 190 to raise the pistons 190 and move the scoopes 98 into their in or feeding position, with air from the upper side of the pistons 190 being exhausted through conduit 188.

The scoop lockout and reset valve 172 is used if it is desired to move both scoops 98 into their out position during operation of the machine and must also be set in its reset position at start-up so that a scoop reset valve 194 when actuated, will cause the scoop actuator valve 178 to move into its second position. For this purpose, the scoop lockout and reset valve 172, in its reset position as shown in FIG. 8, connects machine air to a conduit 196 running to a port in the scoop reset valve 194. In the lockout position, machine air is connected by conduit 198 through a two-way check valve 200 to a conduit 202 running to the righthand pilot side of the scoop actuator valve 178 to actuate the pilot to move the scoop actuator valve 178 into its first or scoop-out position. The scoop lockout and reset valve 172 is manually actuated into its lockout and reset positions.

The scoop reset valve 194 is a manually actuated, spring return valve having a normally off position. When the scoop reset valve 194 is actuated, machine air flowing through the conduit 196 from the scoop lockout and reset valve 192 passes through the scoop reset valve 194 to a conduit 204 and through a two-way check valve 206 to a conduit 208 running to the lefthand side of the scoop actuator valve 198 to cause the scoop actuator valve to move into its second or scoop-in position.

The scoop in and scoop out valves 174 and 176 are cam actuated, spring return valves which are mounted on the delivery frame member 112 in a position to be contacted by a cam 210 mounted on the press head 84 of each individual forming unit 36. The cam 210 on each forming unit is manually adjustable between an outer, valve actuating position and an inner, nonactuating position shown in phantom in FIG. 8. The scoop out valve 176 is positioned such that it will be actuated prior to scoop in valve 174 upon rotation of a forming unit 36. In the normal nonactuated position of both the scoop in and scoop out valves 174 and 176, the flow of machine air entering the valve is blocked. However, when the scoop out valve 176 is actuated by cam 210, the valve is moved into its actuated position wherein machine air will flow through the valve to a two directional check valve 212 and the check valve 200 to conduit 202 to the righthand pilot side of the scoop actuator valve 178 and actuate the pilot to move the scoop actuator valve 178 into its first or scoop-out position thereby disabling both scoops. When the cam 210 actuates the scoop in valve 174, machine air can pass through the valve and check valve 206 through conduit 208 to the lefthand pilot side of the scoop actuator valve 178 to actuate the pilot to move the scoop actuator valve 178 into its second position wherein each scoop 98 is moved into its in or feeding position.

A stop gate 214 is provided on the machine in a position to be tripped by either an operator or by an improperly functioning mechanism on an individual unit as the machine rotates. The stop gate when closed and in its normal position normally actuates a stop gate valve 216 into its second or actuated position providing communication between a conduit 218 running from the brake valve 182 and a pressure switch 220. The stop gate valve 216 is shown in its first or inactivated position in the drawing.

The brake valve 182 is pilot operated into its first position shown in the drawing and is manually actuated into its second or running position. In the first position, machine operating air is fed through the brake valve 182 to the brake mechanism 76 for actuation thereof, and exhaust from the pressure switch passes through conduit 218 and through the brake valve 182 to be exhausted if the stop gate valve 216 is in its actuated position. When the brake valve 182 is in its second or running position, machine operating air is fed through the conduit 218 to the stop gate valve 216 and provides a means for exhausting fluid from the brake mechanism 76.

The shut down valve 180 is solenoid actuated with a spring return. When the pressure switch 220 is actuated by machine air coming from the brake valve 182 through the stop gate valve 216, an electrical circuit is completed in which the solenoid actuator of the shut down valve 180 is located. In its nonactuated position, as shown, the shut down valve 180 provides a connection for machine air to pass through conduit 223 to the pilot of the brake valve 182 to actuate the brake valve 182 into its first position. Additionally, machine air is fed by conduit 225 through the check valves 212 and 200 and conduit 202 to the righthand pilot side of the scoop actuator valve 178 to move the scoop actuator valve 178 into its first or scoop out position. When the solenoid actuator of the shut down valve 180 is actuated and the shut down valve 180 is moved into its second position, the flow of machine air to the pilot actuators of the brake valve 182 and the scoop actuator valve 178 is cut off and the lefthand pilot side of the brake valve is connected to exhaust.

Two scoop selector valves 227 and 229 are provided, one positioned in the conduit running to the bottom side of the pistons in one of the scoop cylindes 186 and the other in the conduit running to the bottom side of the piston in the other one of the scoop cylinders 104. Each of these valves is manually actuatable between two positions, the first of which permits flow from conduit 192 to the scoop cylinder 184 or 186. In the second position, or blank out position, flow from conduit 192 to the scoop cylinder 184 or 186 is blocked and the bottom side of the piston 190 is vented to atmosphere.

Assuming that the machine has been shut down, the scoops 98 are in their out or disabled position and that the stop gate 214 has been opened, it is first necessary to close the stop gate 214 to position the stop gate valve 216 in its second or actuated position. To complete the starting cycle, the brake valve 182 must be manually reset into its second position so that machine operating air will flow through the stop gate valve 182 to the pressure switch 220 which, when closed, will actuate the shut down valve 180 into its second position and remove the pilot air from the brake valve 182 and the scoop actuator valve 178. When it is then desired to move the scoops 98 to their feeding position, the scoop reset valve 194 is actuated so that machine operating air flows through the scoop lockout and reset valve 172, through the scoop reset valve 194 to the lefthand pilot side of the scoop actuator valve 178 to move it into its second position wherein machine air can flow through conduit 192 to the bottom side of the pistons 190 and raise the pistons 190 to move the scoops 98 into their feeding position.

In some instances it may be desirable to only feed one of the blank molds for a period of time. For example, upon start-up it may be desirable that the blank mold to the rear of the forming unit be fed glass first so that the glass can be removed from that blank mold and its associated blow mold until the molds reach their proper temperature and satisfactory glass articles are being produced. At that point, glass can also be fed to the front blank mold and its associated blow mold whereupon glass can be removed from those molds until the molds have reached their proper temperature and satisfactory glass articles are being produced. In the meantime, the articles being produced in the rear molds can be allowed to continue being processed through the lehr in the conventional manner. To lockout one of the scoops, its associated scoop selector valve 227 or 229 may be actuated into its second position. Then, when the scoop reset valve 194 is actuated and the scoop actuator valve 178 is actuated into its second position to enable machine operating air to pass to conduit 192, machine air will be blocked to the scoop cylinder 184 or 186 whose valve 227 or 229 has been actuated and the scoop 98 will remain in its out or disabled position. Machine operating air will flow to the other of the scoop cylinders 184 or 186 to move that scoop 98 into its feeding position.

If, when the machine is running, if it is desired to move both of the scoops 98 into their disabled or out position, the scoop lockout and reset valve 172 is actuated into its lockout position whereupon machine operating air will be fed to the righthand pilot side of the scoop actuator valve 178 to move it into its first position whereupon machine air flows to the top side of the pistons 190 through conduit 188 and the scoops 98 are moved into their disabled position. When it is then desired to move the scoops 98 back to their feeding position, the scoop lockout and reset valve 172 is moved into its reset position and the scoop reset valve 194 is manually actuated to move the scoop actuator valve 178 into its second or scoop-in position.

The scoop in and scoop out valves 174 and 176 provide a means for disabling the feeding of gobs of glass to one forming unit during operation while feeding gobs to the others. If it is desired not to feed gobs to a forming unit 26, the cam 210 associated with that unit is moved into its out position. Thus, as the machine rotates and that forming unit is moved to a position underneath the delivery mechanism, the cam 210 will actuate the scoop out valve 176 causing machine air to flow through conduit 202 to the righthand pilot side of the scoop actuator valve 178 moving it into its first or disabled position which causes the scoops to be disabled. Continued rotation of the forming unit, after a passage of time sufficient to allow the sheared gob to fall into the cullet chute, results in the cam 210 actuating the scoop in valve 174 which, when actuated, causes machine air to flow through conduit 208 to the lefthand pilot side of scoop actuator valve 178 and actuate it into its second position whereby machine operating air will flow through conduit 192 to the bottom side of the piston 190 to move the scoops 98 into their feeding position.

In the event that the stop gate 214 is opened for any reason, the stop gate valve 216 will move into its first position whereupon machine air to the pressure switch 220 is blocked and the pressure switch 220 will open causing the shut down valve 180 to be deenergized and moved into its first position and also deenergize the machine drive motor 52. Movement of the shut down valve 180 into its first position results in machine operating air being fed to the pilot side of the brake valve 182 to cause actuation of the brake mechanism and also causes machine operating air to flow to the righthand pilot side of the scoop actuator valve 178 to move it into its first position so that both scoops 98 will be disabled.

III. INDIVIDUAL FORMING UNIT

As each of the individual forming units are preferably identical, the description of the various mechanisms with respect to one such unit will suffice with the understanding that the description thereof is applicable to all units.

A. NECK RING MECHANISM

As shown in FIGS. 10 and 14–16, a neck ring arm or plate member 222 extends horizontally outwardly from the machine in a radial direction, and is attached at its inner end to the forming unit frame member 38. The neck ring arm is provided with two openings 224, 226 as shown in FIG. 16, the axes of which are spaced apart in a horizontal direction along a radius of the machine so that the axes of each lies in a vertical plane which passes through the axis of rotation of the machine.

A neck ring assembly 228 is mounted within each of the openings. FIGS. 10–13 show the details of one of the two identical neck ring assemblies 228. Each neck ring assembly 228 includes a generally circular neck ring holder 230 in which four neck ring jaws 232 are pivotally mounted on a horizontal axis 234. Attached to the bottom surface of each of the neck ring jaws 232 is a quarter segment of a neck ring 236, which, when all four segments are in their closed position, form a complete circle. A plunger holder 238 having a circular cross-section has a plurality of flanges 240 extending radially outwardly which are secured to web portions 242 on the neck ring holder 230. Attached to the bottom end of the plunger holder is a plunger ring 244. The plunger ring has a circular cross-section, an inner surface 246 which tapers inwardly and downwardly, and a bottom surface provided with a circular groove 248.

The neck ring holder 230 has a plurality of outward extending projections or bayonets 250 on its bottom outer edge which mate with inwardly extending projections or bayonets 252 on the top inner edge of a ring gear 254 to provide a quick release bayonet connection between the neck ring assembly 228 and the ring gear 254.

Each of the neck ring jaws 232 includes a projection 256 which extends above the upper surface of the neck ring holder and which is provided with an outer curved surface 258. Two legs 260, 262 extend downwardly from an upper portion 264 from which the projection 256 extends to a base portion 266. The base portion 266 has inner and outer curved surfaces. Intermediate the ends of each leg portion 260, 262 is an aperture 268 through which a pin member 270 passes. The dowel member is mounted at each end in spaced downwardly extending lugs 272 on the neck ring holder 230 whereby each neck ring jaw 232 and thus the neck ring segment 236 is free to pivot about the pin member 270 on axes 234. A spring member 274, wound around each pin member 270 has its upper end mounted in an aperture 276 in an inwardly extending tongue 278 on the neck ring holder 230, and its lower end wrapped around a peg 280 extending from one of the legs 260 of the jaw member 232. Each spring 274 urges its respective jaw member 232 and its attached neck ring segment 236 into its closed position with its upper inner surface engaging the outer surface of the plunger ring 244.

The ring gear 254 associated with each of the neck ring assemblies 228 has a downwardly extending flange 282 which is mounted on the upper race 284 of a ball bearing assembly 286. The lower race 288 of the ball bearing assembly is mounted in a counterbore 290 in the opening 224 in the neck ring arm 222. As shown in FIG. 13, the lower race 288 includes a groove 290 which in cross-section has a radius slightly larger than the radius of the ball members positioned therein. The running surface 292 of the upper race 284 which bears upon the ball members 294 is flat. A flange 296 extends downwardly at the inner edge of the upper race 284 and includes a generally flat upper inner surface 298 perpendicular to the upper running surface 292 and an inner lower tapering surface 300 tapering downwardly and away from the ball member 294. When the upper race 284 is in its downward position, the ball members 294 are contained vertically between the upper running surface 292 of the upper race 284 and the groove 290 in the lower race 288. Also in that position, the flat surface 298 of the flange 296 of the upper race member 284 engages the ball members 294 which in turn are pressed against the inner vertical surface 302 of an upstanding flange 304 at the outer edge of the lower race 288. When the upper race 284 is raised relative to the lower race 288, so that the flange 296 of the upper race 284 is raised into the dotted line position as shown in FIG. 13, the tapering surface 300 of the flange 296 will be adjacent the innermost portion of the ball members 294 and clearance will be provided between the ball members 294 and the flange 296 whereby the upper race 284 can float in a horizontal plane for a purpose to be explained below.

Figure 15:
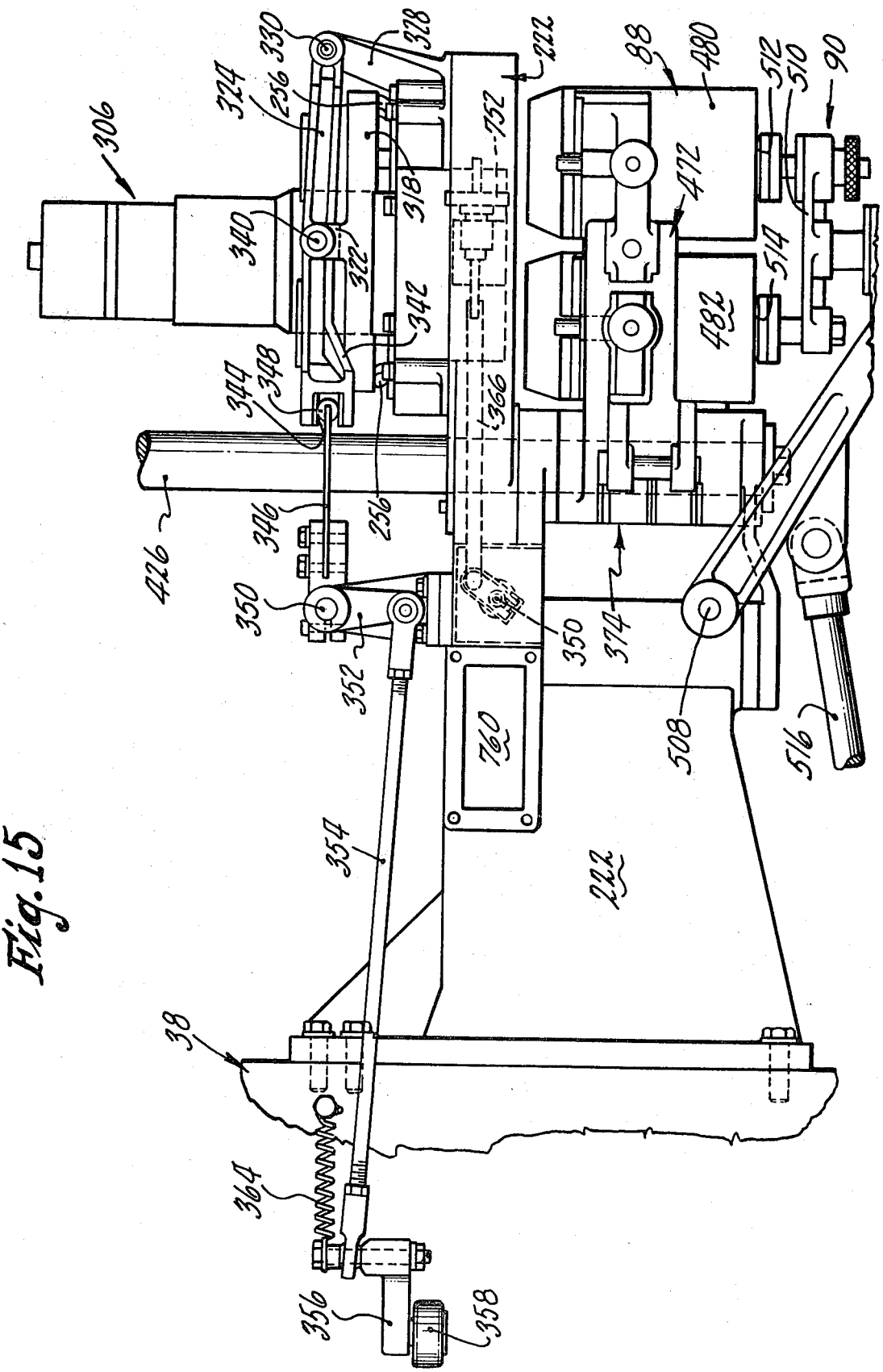
FIG. 15 is an elevational view of a portion of an individual forming unit with the blow molds in their operative or closed position.

The ring gears 254 attached to the neck ring holders 230 of both neck ring assemblies 232, are in meshing engagement with a suitable gear (not shown) attached to the drive shaft of an air motor 306 (FIGS. 14 and 15).

Suitable motive air is provided to the motor by a suitable conduit (not shown) connected through a cam actuated valve (not shown) mounted on the frame 38 actuated by the cam follower 308 which is in turn actuated by a cam positioned within cam slot 310 on the cam drum 8. A suitable cover member 314 is attached to the neck ring arm 222 and encloses the outer surface of both ring gears 254 and the air motor ring gear.

A neck ring opening mechanism 316 is provided as shown in FIGS. 10, 14 and 15 which includes a neck ring cam ring 318 having downwardly projecting tapering cam surfaces 320 adapted to engage the curved outer surface 258 of the projections 256 of the neck ring jaws 232 of each neck ring assembly 228 when moved in a downward direction. The neck ring cam ring 318 in a position intermediate the neck ring assemblies 228 is provided with an upstanding lug 322 having an aperture horizontally therethrough. A neck ring lever 324 has two outer legs 326 pivotally attached to brackets 328 extending upwardly from the neck ring arm 222 by means of a removable pin member 330 extending therethrough. To prevent inadvertent removal of the pin member 330, the pin is provided with an undercut 332 in its surface for the reception of a hook member 333 pivotally attached to one of the brackets 328. The neck ring lever 324 includes a first body portion 334 having an opening therein to provide clearance for the plunger holder 238 of the outer neck ring assembly 228 and a second body portion 336 having an opening therein for clearance of the plunger holder 238 of the inner neck ring assembly 228. The two body portions are interconnected by two webs 338 having an aperture therethrough. The lug 322 of the neck ring cam ring 318 extends upwardly between the two webs 338 and is mounted for rotation with respect to the neck ring lever 324 by means of a shaft member 340 extending through the apertures in the lugs 322 and webs 338. The neck ring lever 324 includes two arms 342 extending rearwardly toward the frame 38 of the individual forming unit 36 and having a slot 344 in their end face. A leaf spring 346, provided at its outer end with cylindrical member 348, is mounted in each of the slots 344 of the arms 342 with the cylindrical member 348 positioned within the slot 344. The other end of the leaf spring 346 is attached to a crank shaft 350 by suitable means as shown. The crank 352 attached to the crank shaft 350 is attached to an elongated rod member 354 which in turn is attached to one end of a rocker shaft cam follower 356 which is mounted for pivotal movement about an upstanding pivot point mounted on the frame member 38 of the individual forming unit 36. The opposite end of the cam follower 356 is provided with a cam roller 358 to engage a cam 360 in a cam slot 362 of the cam drum 8 of the machine.

A spring member 364 is provided between the cam follower 356 and the frame 38 to bias the cam roller 358 toward the cam drum 8 and thus, as viewed in FIGS. 14 and 15, to bias the rod member 354 to the right toward the front of the forming unit 36. This in turn tends to rotate the crank shaft 350 counterclockwise as viewed in FIG. 15 causing the leaf springs 346 to rotate counterclockwise and in turn lifting the end of the leaf springs 346 engaging the neck ring lever 324 to rotate the neck ring lever 324 clockwise about the axis of the pin member 330. This movement lifts the neck ring cam ring 318 up and out of engagement with the projections 256 on the neck ring jaws 232.

When the cam roller 358 engages the cam 360 on the cam drum 8, the rod member 354 is moved rearwardly of the forming unit 36 and the crank arm 352 is pivoted clockwise as viewed in FIG. 15, causing the leaf spring 346 to force the neck ring lever 324 and the neck ring cam ring 318 to pivot downwardly about the axis of the pin member 330. When the neck ring cam ring 318 is pivoted downwardly, the cam surface 320 thereof will engage the curved surface 258 of both of the neck ring jaws 232 causing the neck ring jaws 232 to pivot about their axis 234 and against the bias of their spring members 274 with the result that the neck ring segments 236, attached to each neck ring jaw 232 move outwardly to release the glassware article.

To provide for manual release of glassware articles held by the neck ring assemblies 228, a lever member 366 is attached to the end of the crankshaft 350 opposite the crank arm 352 and extends forwardly in the forming unit 36 terminating in a handle 368. Pushing the handle 368 downwardly rotates the crank shaft 350 to cause the neck ring cam ring 318 to pivot downwardly and open the neck ring segments 236.

The bayonet connection between the neck ring assemblies 228 and the ring gear 254 provide a means for quickly changing the neck ring assemblies. To change one or both of the neck ring assemblies 228, the pin member 330 attaching the neck ring lever 324 to the neck ring arm 222 may be removed and the neck ring lever 324 and the neck ring cam ring 318 may be lifted off the neck ring assemblies 228. The neck ring assemblies 228 may then be rotated relative to ring gear 254 to align the bayonets to permit withdrawal of the neck ring assembly 228 relative to the ring gear and neck ring arm 222.

B. BLANK MOLDS AND PRESS HEAD

Figure 9:
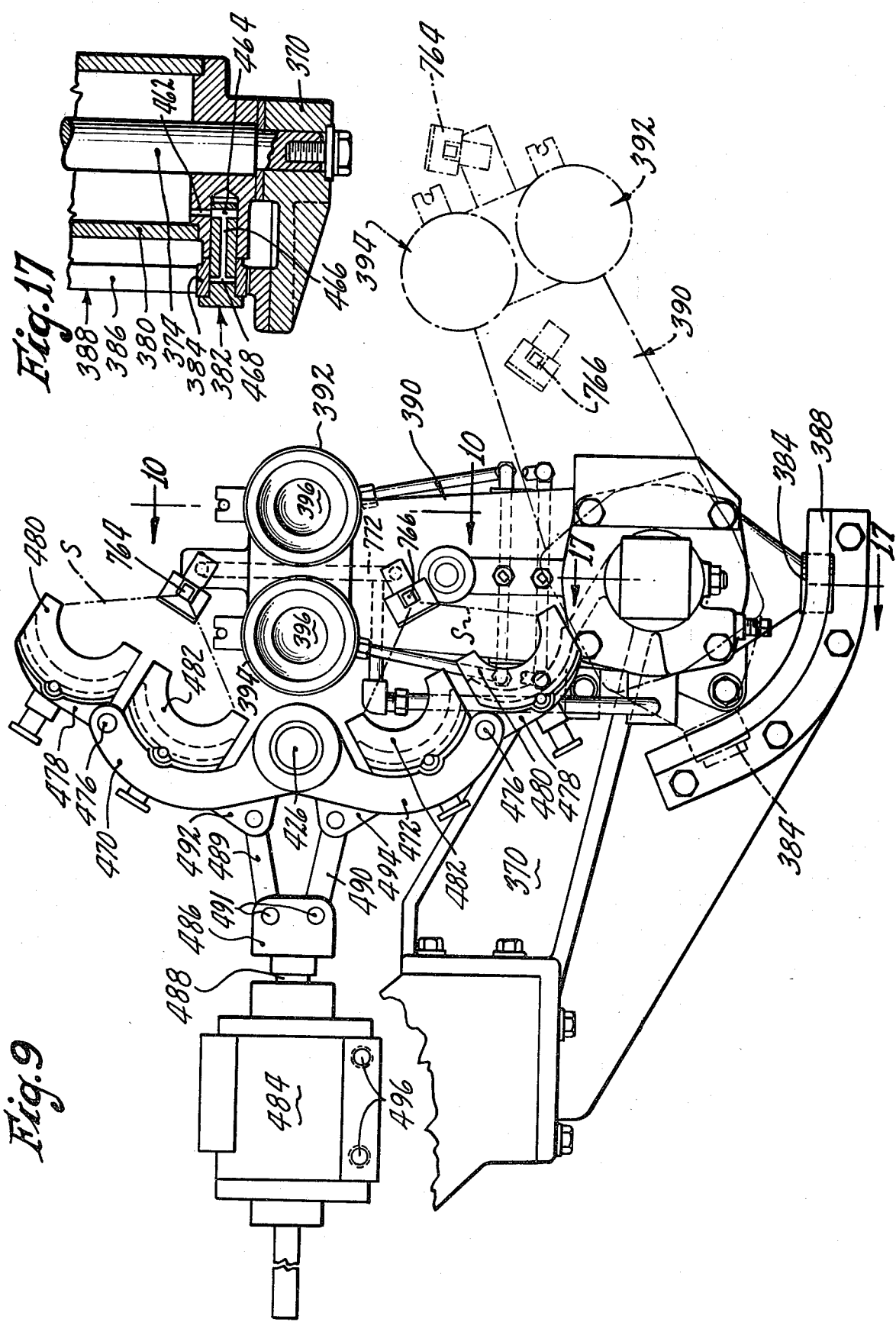
FIG. 9 is a partial plan view of the operating mechanisms of an individual forming unit with the neck rings omitted for the sake of clarity.

Referring to FIGS. 2, 9 and 10, a bracket member 370 extends outwardly from the lower end of the frame member 38 of each forming unit 36. Mounted on the bracket member 370 is a blank mold actuating mechanism 372 which includes a vertically extending stationary piston rod 374 having a stationary piston member 376 thereon. The piston rod 374 extends from the bracket 370 to a boss 378 on the neck ring arm or plate member 222. A movable blank mold cylinder 380, is provided with the piston member 376 mounted therein. Extending from the cylinder 380 is a cam follower 382 having a roller member 384 positioned within a cam track 386 in a cylindrical cam 388 which is mounted on the bracket member 370. Extending outwardly from the cylinder is a blank mold holder arm 390 to which is attached two blank mold holders 392 and 394.

Each of the blank mold holders 392 and 394 has a blank mold 396 therein which includes a foot portion 398 having an upper surface 400 engaged by a spring biased locking pin 402 which prevents vertical withdrawal of the blank mold 396 from its blank mold holder 392 or 394. The uppe end of each blank mold holder 392 and 394 is in engagement with its blank mold 396 around the circumference thereof as shown in FIG. 10.

The cam track 386 in the cylindrical cam 388 is adapted to impart rotary motion around the axis of the piston rod 374 to the blank mold holder arm as the cylinder 380 moves up and down. In the lower position, the blank molds 396 are positioned downwardly and outwardly with respect to the neck ring assemblies 228. Thus as shown in FIGS. 4 and 9, when the cylinder 380 is in its lower position, it can be seen that the axis of the outer blank mold 396 is positioned a greater distance from the axis of the machine in a radial direction than the other inner blank mold 396. Additionally, a plane passing through the axis of the outer blank mold 396 and the axis of the machine is angularly offset in the direction of rotation of the machine with respect to the plane passing through the axis of the inner blank mold 396 and the axis of rotation of the machine. Upon movement upwardly of the blank mold cylinder 380, the cam track 386 serves to rotate the cylinder 380 so that the blank molds 396 pivot about the axis of the piston and are positioned under the neck ring assemblies 228 wherein the axes of both blank molds 396 lie in a plane passing through the axis of rotation of the machine as shown in FIG. 4. As will be noted from the shape of the cam slot in FIG. 2, rotation of the cylinder 380 about the piston rod 376 takes place during the initial upper movement of the cylinder 380, while the latter part of the upper movement is substantially vertical with no rotation.

Referring to FIG. 10, as was mentioned before, the neck ring assembly 228 is capable of floating in a horizontal plane when the upper race 284 of the bearing assembly 286 is raised. Thus, as each blank mold 396 is moved upwardly and engages the bottom surface of the neck ring segments 236, and the neck ring assembly 228 is raised lifting the upper race off the bearing whereupon the neck ring assembly 228 can float to properly align itself with the blank mold 396. When the blank molds 396 are moved to their lower position, neck ring assembly 228 moves downwardly so that the upper race 284 is again in contact with the ball members 294 and the neck ring assembly 228 becomes fixed in a horizontal plane.

A system is provided for cooling the sides of each blank mold 396 and a separate system is provided for cooling the bottom of each blank mold 396. As shown in FIG. 10, a suitable conduit 404 is provided through the blank mold holder arm 390 and the bottom of the blank mold holders 392 and 394 to a chamber 406 between the side of each blank mold 396 and the interior of its blank mold holder 392 or 394. Suitable openings 408 in the sidewall of each blank mold holder 392 and 394 provide an exit for cooling air as indicated in FIG. 10. For cooling the bottom surface of each blank mold 396, a suitable conduit 410 extends into a chamber 412 in each blank mold holder 392 or 394 and extends into a recess 414 in the bottom of each blank mold 396. A horizontally extending exit port 416 is provided between the chamber 412 in each of the blank mold holders 392 and 394 and the atmosphere so that cooling air passing through the conduit 410 impinges upon the bottom surface of each blank mold 396 and exits through the port 416 to the atmosphere. Both conduits 410 and 404 are connected in suitable manner to a supply of cooling air through adjusting valves positioned on the neck ring arm 222 immediately below the valves 418 and 420 shown in FIG. 14.

The press head 84 as shown in FIG. 2 is of generally conventional design except that it includes two plunger members 420 and 422 for cooperating with the two blank molds 396. The press head 84 may include a generally L-shaped bracket 424 attached to the upper portion of the frame unit 38. The L-shaped bracket 424 supports the upper end of a fixed piston rod 426 having a fixed piston 428 thereon, while the lower end of the piston rod is supported in the neck ring arm 222. A press head cylinder 430 is mounted about the fixed piston 428 and includes a rearward extending flange portion 432 having a cam follower 434 mounted thereon which engages a vertical cam track 436 on the bracket member 424. Each of the plunger members 420 and 422 includes a plunger portion 438 having an upwardly extending plunger rod 440 attached to the press head cylinder 430 by a spring member 442. A plunger plate 444 is provided in association with each plunger member 420 and 422 and is spring biased downwardly. As shown in FIG. 10, when the press head cylinder is moved downwardly by admission of operating air to the lower side of the fixed piston 428 in conventional fashion, each plunger portion 438 passes through the plunger ring 244 of the neck ring assembly 228 and into its associated blank mold 396 with force being exerted on the plunger and by the spring member 442. Each plunger plate 444 engages the upper surface of its associated plunger holder 238 and forces the plunger ring 244 tightly against the neck ring segments 236 and the neck ring segments 236 tightly against the blank mold 296.

Flow of operating air to both the blank mold cylinder 380 and the press head cylinder 430 is controlled by cam actuated valves mounted on the frame 38. Referring to FIG. 2, a cam in cam groove 446 activates a rocker arm cam follower 448 to actuate a suitable valve to cause operating air to flow to the blank mold cylinder to raise the blank molds 396. A cam positioned in cam groove 450 actuates a rocker arm cam follower 452 to actuate a suitable valve to cause operating air to flow to the blank mold cylinder 380 to lower the blank molds 396. Similarly, a cam in cam groove 454 actuates a rocker arm cam follower 456 to actuate a valve to cause operating air to flow to the press head cylinder 430 to cause its downward movement. A cam in cam groove 458 actuates a rocker arm cam follower 460 to actuate a valve to cause operating air to flow to the press head cylinder 430 to cause its upward movement.

Figure 17:
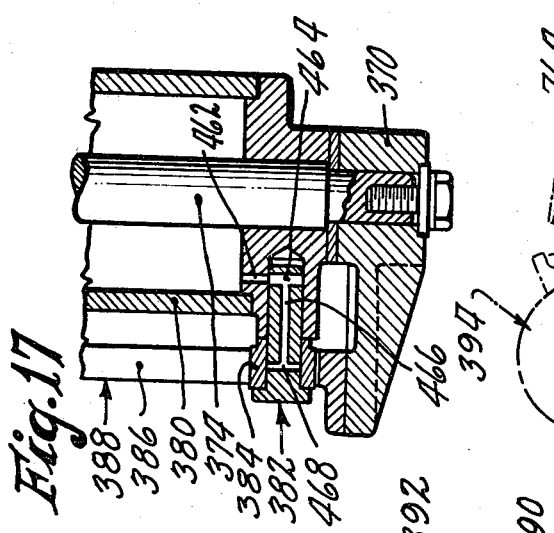
FIG. 17 is a partial sectional view taken along the lines 17—17 of FIG. 9.

FIG. 17 shows a means for providing lubrication of the roller member 384 of the cam follower 382 of the blank mold cylinder 380. A bore 462 in the base of the cylinder 380 provides communication between the interior of the cylinder 380 and a vertical bore 464 in the cam follower shaft 465. A longitudinal bore 466 provides communication between bore 464 and a vertical bore 468 which in turn provides communication with the inner surface of the roller member 384. As the interior of the cylinder 380 normally contains some lubricant, when the cylinder is actuated to its up position where the base approaches the piston member 376, lubricant is forced through the bores 462, 464, 466 and 468 to the inner surface of the roller member 384.

C. BLOW MOLDS

The blow molds 88 shown in FIGS. 4, 9, 15 and 16 include a pair of molder holder arms 470 and 472 mounted in a suitable bearing structure 474 pivoting into the open and closed positions about a lower extension of the vertically extending piston rod 426 of the press head 84. Pivotally attached by a pivot pin 476 to each of the mold holder arms 470 and 472 is a mold holder 478. Each mold holder 478 has an attachment mechanism for suitably holding two half segments 480 and 482 of split blow molds. To actuate the blow mold segments 480 and 482 into their open and closed positions there is provided a piston and cylinder mechanism 484 having a bifurcated member 486 at the outer end of its piston rod 488 in which two links 489 and 490 are pivotally mounted by pivot pins 491. One of the links 489 is pivotally attached to a boss 492 on one of the molder holder arms 470 while the other link 490 is pivotally attached to a boss 494 on the other mold holder arm 472. As shown in FIG. 16, the piston and cylinder mechanism 484 is attached to the underside of the neck ring arm or plate member 222. The piston and cylinder mechanism 484 has suitable connections 496 for receiving operating air for moving the piston rod 488 into the mold-open or mold-closed position. These connections are connected in a conventional manner (not shown) to a source of operating air through suitable cam operated spool valves 498 and 500 which are actuated by cams positioned in the cam grooves 502 and 504 as shown in FIG. 2. One valve 498 controls air for opening the blow molds 88 while the other valve 500 controls air for closing the blow molds 88.

The orientation of the blow molds 88 is such that when the blow mold segments 480 and 482 are closed, their parting lines lie in a plane which passes through the axis of rotation of the machine. Stated another way, the pivot axis of the blow molds lies in a plane containing the vertical axis of both neck ring assemblies 228 and which also contains the axis of rotation of the machine.

D. BOTTOM PLATES

As shown in FIGS. 2 and 15, the bottom plates 90 include an arm 506 pivotally attached by pivot pin 508 to a side bracket 410 on the neck ring plate or arm member 222. Attached to the end of the arm 506 is a plate member 510 in which two bottom plates 512 and 514 are mounted. At a point intermediate its ends, the arm 506 is pivotally attached to the end of the piston rod 516 of a piston and cylinder mechanism 518. Suitable conduits (not shown) are connected to the piston and cylinder mechanism 518 for actuating the piston rod 516 outwardly to raise the bottom plates 512 and 514 into their up position as shown in FIG. 4 and to move the piston rod 516 in the opposite direction to move the bottom plates 512 and 514 into their lower position as shown in FIG. 2. Fluid flow in the conduits is controlled by cam actuated spool valve (not shown) mounted on the frame 38 in a conventional manner. The spool valves are actuated by cam followers 518 and 520 which are actuated by cams mounted in the cam grooves 522 and 524. The bottom plates 512 and 514 of the embodiment shown in FIGS. 2 and 4 move upwardly against the bottom end of each of the blow molds 88 as shown in FIG. 15.

FIGS. 18–21 show an alternative embodiment of the bottom plates. According to this embodiment an angular bottom plate arm 526 is pivotally attached to the side plate of the neck ring plate or arm member 222 by a pivot pin 528 in a manner similar to the previous embodiment. The free end of the bottom plate arm 526 is provided with a generally cylindrical portion 530 having two opposed windows 532 and 534 therein as well as two opposite side portions provided with flats 536. The upper and lower ends of the cylindrical portion is provided with upper and lower caps 538 and 540 as shown in FIG. 19. Mounted within the cylindrical portion 530 is an elongated screw shaft 542 having a threaded sleeve 544 secured thereon. The outer surface of the threaded sleeve 544 is in sliding engagement with an aperture 546 in the lower cap 540. A second sleeve member 548 is positioned about the screw shaft 542 at a position immediately above the first threaded sleeve 544 and has a portion of its outer surface in sliding engagement with an aperture 550 in the upper cap 538. A portion of the screw shaft 542 is provided with an axially extending key slot 552 and the second sleeve member 548 is provided with a slot 554 therein whereby a key portion 556 provided in the upper cap 538 extends through the second sleeve member 548 into the key slot 552 in the screw shaft 542 to prevent relative rotation between the screw shaft 542 and the caps 538 and 540 and the cylindrical portion 53 of the bottom plate arm 526. A spring member 558 is provided between the underside of the upper cap member 538 and a flange 560 at the lower portion of the second sleeve member 548 to bias the screw shaft 542 into its lower position relative to the bottom plate arm 526 wherein a flange portion 562 on the lower threaded sleeve 544 engages the top surface of the lower cap 540.

Attached to the upper end of the screw shaft 542 is a bottom plate bracket member 564 having two oppositely extending arms 566 and 568 thereon. Each of the arms 566 and 568 is provided with an aperture 570 in which a supporting shaft 572 is keyed. A spring member 574 is positioned between an upper flange 576 on each of the supporting shafts 572 and the upper face of the bracket member 564 to urge the supporting shafts 572 into their upper position in which they are restrained from further movement by a washer member 578. A bottom plate holder 580 is mounted on the upper end of each of the supporting shafts 572 including a bearing assembly 582 to permit relative rotation between bottom plate holders 580 and their supporting shafts 572. A plate member 584 serves to hold the bottom plate holders 580 on the shafts 572.

A bottom plate 586 having a flange portion 588 provided with bayonets is mounted within each of the bottom plate holders 580 which are provided with an in-turned flange 590 also provided with bayonets to provide a bayonet connection between the bottom plates 586 and their bottom plate holders 580.

A spring biased detent 592 mounted within each of the bottom plate holders 580 engages each bottom plate 586 to prevent relative rotation between the bottom plates 586 and the bottom plate holders 580 so that rotation of the bottom plates 586 will result in the bottom plate holders 580 rotating about the upper portion of their supporting shafts 572 by virtue of the bearing assembly 582. To facilitate removal of each bottom plate 586 with respect to its bottom plate holder 580, the underside of each bottom plate holder 580 is provided with an aperture 594 which is adapted to mate with a dowel 596 mounted in the bottom plate arm 526. When it is desired to disconnect a bottom plate 586 from its bottom plate holder 580, the bottom plate 586 and bottom plate holder 580 may be depressed against the action of the spring member 574 and rotated until the dowel pin is received within the aperture in the bottom plate holder. Continued rotation of the bottom plate 586 will result in relative rotation between it and the bottom plate holder 580 to align the bayonet connects in a position in which the bottom plate 586 may be removed. Insertion of a new bottom plate is accomplished in a similar manner.

As will be noted from FIG. 21, in some instances it is desirable that the bottom plate 586 extend up into the blow mold 88. This is true for example in the case where the bottom plate 586 is used to form a fluted foot on the bottom of a glassware article. In such a case it is desirable that the bottom plate bracket member 564 have a straight stroke in a vertical direction as the bottom plates 586 are entering and being removed from the molds. For this purpose, a bifurcated lever arm 598 is provided having one end connected to the fixed pivot pin 528 and each of its free ends 600 and 602 pivotally attached to a sliding key 604. Each sliding key 604 is positioned within one of the windows 532 and 534 in the cylinder portion 530 of the bottom plate arm 526 and also within a circumferential groove 606 in the threaded sleeve 544. The sliding keys 604 permits the free ends of the lever arm 598 to move in a horizontal plane with respect to the threaded sleeve 544. The piston rod 516 of the piston and cylinder mechanism 518 of the type described before is connected to the lever arm 598 by a pivotal connection 607 at a point intermediate the ends thereof. An adjustable stop member 608 is mounted in a boss 610 on the bottom plate arm 526 and is adapted to engage a stop surface 611 on the bottom of the bearing structure 474 of the blow molds 88 when the bottom plate arm 526 is in its upper position. FIG. 19 shows the bottom plates after they have been pivoted about the fixed pivot pin 528 to a point where the adjustable stop member 608 abuts the stop surface 611. Further outward movement of the piston rod 516 causes the lever arm 598 to continue its pivoting movement which, because of the sliding connection of the sliding keys 604 with respect to the threaded sleeve 544 translates into vertical movement of the screw shaft 542 in an upward direction relative to the cylindrical portion 538 of the bottom plate arm 526. This upward motion is continued until the bottom plates 586 are properly seated within the blow molds 88. With the construction described, when the piston rod 516 is moved in the opposite direction, the screw shaft 542 is moved vertically downwardly in a straight stroke until the bottom plates 586 are free of the blow molds 88.

A hand knob 612 attached to the threaded sleeves 544 is provided for rotating the threaded sleeve 544 relative to the screw shaft 542 for adjusting the height of the screw shaft 542 and thus the bottom plates 586 relative to the bottom plate arm 526. This is accomplished due to the fact that rotation of the hand knob 612 will result in axial movement of the screw shaft 542 since the screw shaft 542 is prevented from rotating by means of the key portion 556 of the upper cap 538.

Thus, by virtue of the above described construction, the bottom plates 586 can be pivoted about a fixed point during the first portion of its movement and then be vertically moved upwardly in a straight line to enter the bottom portion of the blow molds 88. Additionally, for the purpose of rotating the bottom plates 586 when the neck ring assemblies and the glassware which they are holding are rotated, a bearing assembly 582 is provided between each of the bottom plate holders 580 and their supporting shafts 572 whereby both the bottom plates 586 and the bottom plate holders are capable of rotating relative to the shafts 572.

D. BLOWHEAD MECHANISM

Referring to FIGS. 2 and 22–25, a blowhead mechanism includes a generally C-shaped bracket member 614 which is mounted on the neck ring arm or plate member 222 and extends upwardly therefrom. The bracket 614 includes upper and lower shaft supporting portions 618 and 620. A blowhead shaft 622 is mounted in the upper and lower shaft supporting portions 618 and 620 of the bracket 614 for rotation therein. A coil spring 624 extends about the shaft 622 and is positioned between the bottom portion of the bracket 614 and a thrust ring 626 attached to the shaft 622. The spring 624 serves to bias the shaft 622 vertically upwardly into its upper position.

Attached to the shaft 622 for rotation therewith at a position above the thrust ring is a blowhead arm 628 having two identical blowheads 630 and 632 at the free end thereof. A cam member 634 is positioned loosely around the shaft 622 and includes a cam track 636 in its lower surface. The cam track 636 includes an inclined portion 638 and a straight vertical portion 640. A cam follower 642 in the form of a roller member is mounted on the shaft 622 and is in engagement with the cam track 636 of the cam member 634. If desired, the shaft 622 may be provided with a second cam roller diametrically opposed to the one shown in FIG. 23 which would engage another cam track similar to the cam track 636 shown.

A lever arm 644 is pivotally attached to the cam member 634 by means of a pivot pin 646 and extends rearwardly toward the frame 38 of the forming unit 36 where it is attached to a cam follower 648. The cam follower 648 is actuated by a suitable cam 650 positioned in the slot 652 of the cam drum. A spring member 654 is attached by means of a spring clip 656 to the upper portion of the bracket 614 and extends rearwardly in the machine to another spring clip 658 which is attached to the cam follower 648. The cam 650 tends to rotate the cam follower 648 in a manner such that the blowheads 630 and 632 are moved into their inactive dotted line position in FIG. 22. When the cam follower 648 is free of the cam 650, the spring member 654 urges the lever arm 644 in the opposite direction to rotate the blowhead arm 628 and blowheads 630 and 632 into their solid line, operative position shown in FIG. 22. Thus, the blowheads 630 and 632 are positively held in their inoperative position out of alignment with the blow molds 88 by means of the cam 650 and are moved by the spring member 654 into their inner or operative position over the blow molds 88. Mounted on the shaft 622 above the bracket 614 is a stop bracket member 660 having a downwardly extending flange portion 662. A stop member 664 in the form of an adjustable screw 666 is provided in the flange portion 662 to mate with a stop surface 668 provided on the bracket member 614.

Each of the blowheads 630 and 632 includes a counterbore 670 in the blowhead 628 in which is mounted a retainer member 672 having a threaded portion 674 at its upper end secured to the blowhead arm 628 by means of a nut member 676. A retainer plate 678 is mounted on the retainer member 672 and is positioned between the bottom surface of the blowhead arm 628 and the upper surface of a flange 680 at the bottom of the retainer member 672. A spring loaded thrust bearing assembly 682 is provided between the retainer plate 678 and the blowhead arm 628. The bottom surface of the retainer plate 678 has a circular seal 684 mounted therein for sealing engagement with the top surface of the plunger holder 238 of the neck ring assemblies 228 when the blowheads 630 and 632 are in their operative position.

Blowing air is supplied to each blowhead 630 and 632 through a conduit 688 provided in the blowhead arm 628 which mates with a chamber 690 surrounding the retainer member 672 of each blowhead 630 and 632. Each retainer member 672 is positioned with an axial bore 692 communicating with a series of radial openings 694 which communicate with the chamber 690. Spaced circumferentially outward of the central bore 692 in each retainer member 672 is a plurality of axial bores 696 each communicating with a radial opening 698 which in turn communicates with a second chamber 700 surrounding the retainer member 672. This chamber 700 is in communication with a radially extending bore 702 in the blowhead arm 628 to provide for exhaust of the blowing air.

The conduit 688 in a blowhead arm 628 is connected to a source of high and low pressure blowing air in suitable fashion through two cam actuated solenoid valves 704 and 708, one 704 for high pressure air and the other 708 for low pressure. The valves 704 and 708 are actuated by cam followers 710 and 712 mounted on the frame 38 of the forming unit 36 which are actuated at the proper time by cams positioned in the cam slot 714 for high pressure air and the cam slot 716 for low pressure air.

The operation of the blowhead mechanism as described above is controlled by the cam member 634. Normally, the cam member 634 holds the blowhead arm 628 in its inoperative position. The cam 650 on the cam drum 8 is so constructed that when it is desired to operate the blowhead mechanism, the cam permits the spring member to move the lever arm to the left as shown in FIG. 22 causing the cam member 634 to rotate counterclockwise. Since the inclined portion 638 of the cam track 636 is in engagement with the cam follower 642 mounted on the shaft 622, the rotation of the cam member 634 causes the shaft 622 and the attached blowhead arm 628 to also rotate in the same direction. This rotation continues until the stop member 664 attached to the shaft by means of the stop bracket member 660 abuts the stop surface 668 on the bracket 614 and thereby prevents further rotation of the shaft 622. Continued rotation of the cam member 634 relative to the shaft 622 causes the cam follower 642 on the shaft 622 to ride down the inclined portion 638 of the cam track 636 against the force of the spring 624 bearing on the thrust ring 626. This results in the blowhead arm 628 having straight, vertical movement at the end of its horizontal translation until the seal 684 in each of the retainer plates 678 is in proper engagement with the top surface of the plunger holders 238 of the neck ring assemblies 228.

When the cam 650 in the cam slot 652 on the cam drum 8 actuates the cam follower 648 to move the cam member 634 clockwise as shown in FIG. 22, the cam member 634 about the shaft 622 will rotate relative to the shaft 622 permitting the cam follower 642 and the attached shaft 622 to move vertically upwardly as the cam follower 642 rides along the inclined portion 638 of the cam track 636 providing a straight lift for the blowhead arm 628 until the cam follower 642 is engaged by the vertical portion 640 of the cam track 638 whereupon the shaft 622 and the blowhead arm 628 rotate with the cam member 634 into their inoperative position.

The upper portion of the cam member 634 is provided with an outwardly extending tongue portion 718 as shown in FIG. 25. The bracket member 614 at its upper portion is provided with a boss 720 having a bore 722 therethrough. The upper portion of the boss 720 is provided with two perpendicular cross cuts, one 724 of which is deeper than the other 726. A stop pin 728 having a pin 730 therethrough is positioned within the bore 722. The length of the stop pin 728 is such that when its pin 730 is positioned within the shallowest cross cut 726, the stop pin does not extend through the bracket member 614 into position adjacent the tongue 718 on the cam member 634. However, when the pin 730 in the stop pin 728 is positioned in the deeper cross cut 724, the stop pin 728 will extend through the bracket member 618 into a position adjacent the edge of the tongue portion 718 on the cam member 634 when the blowhead arm 628 is in its out or inoperative position. This serves to positively hold the blowhead arm 628 in its out or inoperative position.

By virtue of the above construction, it is noted that the mechanism for moving the blowhead arm 628 in a horizontal plane and for also providing the vertical lift is positioned above the blow molds 88. By virtue of this arrangement, this mechanism is not affected by the dripping lubricant from blow molds 88 as they are sprayed.

D. COOLING AND LUBRICATION

To provide for cooling of the neck ring assemblies 228, the lower turret ring 20 as shown in FIG. 2 is provided with an air inlet manifold 732 which communicates with a manifold (not shown) in each of the frame members 38 of the individual forming units 36 in a manner as described in U.S. Pat. No. 1,979,211. Cooling air is supplied through the manifolds 732 as shown in FIG. 2, up through the manifold in the main frame member 38 and through a manifold 734 in the neck ring arm or plate member 222 as shown in FIGS. 14 and 16. The manifold 734 in the neck ring arm 222 is split into two separate paths, one 736 of which directs air to a chamber 738 in the inner neck ring operating 226. The other path 740 directs air to a chamber 742 in the outer neck ring opening 224. Suitable dampers 744 and 746 are provided in the paths 736 and 740 leading to each of the neck ring openings 224 and 226 to adjust the flow of cooling air therethrough. These dampers 744 and 746 are mounted on coaxial shafts 748 and 750 respectively and are adjustable by adjusting knobs 752 and 754 connected to the shafts 748 and 750 by lever members 756 and 758.

If desired, an opening 760 in the side of the neck ring arm 222 connecting with the manifold 734 may be provided to direct cooling air through air baffle arrangements 762 to direct air to the outside of the blow molds 88 as shown in FIG. 14.

To provide for lubrication of the interior of the blow molds 88 and the bottom plates 90, two blow mold spray nozzles 764 and 766 are provided on the blank mold holder arm 390 as shown in FIG. 10, one for each set of blow mold holders. Additionally, two lower nozzles 768 and 770 positioned downwardly from the blank mold holder arm 390 are positioned to direct a spray of lubricant to the bottom plates 90. The lubricant, which in the usual case is water, is supplied to the nozzles 764, 766, 768 and 770 through a suitable conduit 772 in the blank mold arm which is connected to a lubricant source by any suitable means through a valve (not shown) which is actuated by rocker arm cam follower 774 which in turn is actuated at the proper time when the blank molds 88 are in their up position by a cam member (not shown) positioned in cam track 776 in the cam drum 8. By virtue of the above described construction it will be noted that the blow molds 88 and bottom plate 90 are lubricated by nozzles positioned on the blank mold holder arm 390 and, therefore, the blank molds 44 are positioned above and out of the way of the lubricating fluid and thus are not contaminated thereby. The lubricant fluid is supplied to the nozzles only when the blank mold holder arm 390 is in its up position and the nozzles are in alignment with the blow molds 88 and bottom plate 90 to prevent any contamination of the blank molds.

IV. TAKE-OUT AND TRANSFER MECHANISMS

A take-out mechanism 46 is provided for removing the glassware articles from the individual forming units 36 after they have been blown into their final shape. The take-out mechanism 46 includes a plurality of dead plates 92 mounted for rotation about the center axis 782 of the take-out mechanism in a direction opposite the direction of rotation of the individual forming units 36 about the center axis of the machine. Each dead plate 92 has a pivot point 784 so that the dead plate 92 can pivot as it approaches the transfer mechanism 48 and engages a cam surface 786.

A set of two opposed transfer arms 788 and 790 extends over each of the dead plates 92 with each arm being provided with a C-shaped transfer finger 792. Each set of transfer arms 788 and 790 are cam actuated into their open position and spring biased into their closed position wherein the transfer fingers 792 of each set partially surround the glass articles on the dead plate. The glass articles are deposited on the dead plate 92 by opening the neck ring assemblies. At the same time, the transfer fingers 792 close about the articles to provide a means for steadying the articles. The take-out mechanism 46 is continuously rotated in timed relation to the rotation of the machine for sequential pickup of glassware articles for successive forming units 36 on the machine. The take-out mechanism is timed through its drive mechanism to the machine by its drive mechanism 70. The dead plates 92 rotate around the center axis 782 until they are adjacent the transfer mechanism 48 whereupon the glassware articles thereon are swept by the transfer arm 790 onto the transfer mechanism 48.

The transfer mechanism 48 comprises two separate conveyors 794 and 796 which are driven at different speeds. The two conveyor belts 794 and 796 are driven by a motor 798 whose output shaft is connected through a gear box 800 to a timing unit 802 known as a positively infinitely variable control device (PIV) which allows the speed of the outer conveyor 794 to be varied with respect to the inner conveyor 796 so that the outer conveyor 794 can be run at a faster speed than the inner conveyor 796. The control device 802 has one shaft 804 connected to the drive pulley (not shown) of the inner conveyor 796, and a second shaft 806 connected to the drive pulley of the outer conveyor 794. With this arrangement, the two glass articles from a given deadplate 92 are deposited on the transfer mechanism with the outer article 808 deposited on the outer conveyor 794 and the inner article 810 deposited on the inner conveyor 796. The articles are swept onto the conveyors in a side-by-side relationship which is substantially perpendicular to the direction of movement of the conveyors as indicated by the arrows. By virtue of the fact that the outer conveyor 794 is traveling at a faster speed, the outer glass article 808 will move ahead of the inner article 810.

The conveyors 794 and 796 transport the articles 808 and 810 to a link belt 812 having spaced fingers 814 thereon which form pockets for the reception of an article. The link belt 812 is driven by another motor 816 having its drive shaft connected through a gear box to the drive shaft 818 of the drive sprocket 820. The position of the drive sprocket 820 and one of the idler sprockets 822 provide a running section of the link belt which is inclined with respect to the perpendicular to the direction of travel of the conveyors 794 and 796. The glassware article on the faster moving outer conveyor 794 will be received within a pocket closer to the take-away conveyor 50 and spaced farther away from its point of deposit upon the conveyor 794 than the article placed on the slower conveyor 796. The take-away conveyor 50 extends parallel to and overlaps the conveyors 794 and 796 and travels in a direction parallel to the conveyors 794 and 796. The fingers 814 on the link belt pass over the take-away conveyor 50 whereby the articles, which were placed on the transfer mechanism in double file, are placed upon the take-away conveyor in single file.

V. OPERATION

The operation of the various mechanisms of an individual forming unit 36 as the unit progresses through its cycle by rotation about the center axis of the machine may be understood by referring to FIGS. 3, 4 and 26–35. As a unit passes from the point P-12 to the point P-1 shown in FIG. 4, the blank molds 44, which are in their outer and down position, pass underneath the deflectors 102 of the delivery mechanism 39. As shown in FIG. 26, two gobs "G" are fed simultaneously from the feeder 40 to the two blank molds 44. As the unit progresses from point P-1 to point P-2, the blank molds 44 are swung in and raised upwardly into engagement with the neck ring assemblies 228 and the plunger members 420 and 422 begin their downward movement as shown in FIG. 27. Before reaching point P-2, the plungers 420 and 422 have entered the blank molds and press the parisons "P" as shown in FIG. 28. When the blank molds 44 are in their raised position and the parisons "P" are being formed, the lubricant spray "S" is initiated to lubricate the two sets of blow mold segments 480 and 482 as shown in FIG. 28A and also the bottom plates 90. The spray is cut off prior to the blank molds moving into their down position shown in FIG. 29. Before point P-3 is reached and after the parison "P" has been formed, the blank molds 44 drop down and the plungers 420 and 422 are moved upwardly out of the neck ring assemblies 228 and the rotation of the neck ring assemblies 228 to rotate the parison "P" is begun.

At point P-3, the blank molds 44 are down, the blow molds 88 are closed, and the bottom plates 90 are moved up into engagement with the blow molds 88 and the blowheads 630 and 632 come down into engagement with the neck ring assemblies 228 as shown in FIGS. 30 and 31. Low pressure blowing air is fed through the blowheads 630 and 632 into the interior of the parisons "P" to begin to form the parisons into the shape of the final articles as the neck ring assembly continue to rotate the parison. The application of low pressure air takes place approximately from point P-3 to point P-5 when high pressure air is applied up until point P-10 to blow the articles into final shape while rotation is continued as shown in FIG. 30. Between point P-10 and P-11, the blow air is turned off and rotation stops.

At point P-11, the blow molds 88 are opened and the neck ring assemblies 228 transport the blown articles to point P-12. As the unit approaches point P-12, a dead plate 92 swings underneath the glassware articles and the transfer fingers 792 are moved into surrounding relationship with respect to the glassware articles as shown in FIG. 33. At station 12, the articles are released from the neck ring assembly and dropped onto the dead plate 92 as shown in FIG. 34. The articles are transported by the take-out mechanism 46 to the transfer mechanism 48 whereupon they are moved onto the take-away conveyor 50 as schematically shown in FIG. 35.

V. CONCLUSION

As pointed out before, one feature of the present invention is the provision of a glassware forming apparatus of the type which includes a plurality of individual forming units rotatable about its central axis. In accordance with the present invention, each individual forming unit is capable of making a plurality of glassware articles during one cycle.

Another feature of the present invention, which has not been specifically pointed out previously, is the fact that all the operating mechanisms of an individual forming unit are tied into the neck ring arm of the individual forming units to enhance the alignment of the various mechanisms during the glassware forming operation. Another such feature is the provision of separate means for closing the blow molds and moving the bottom plates into engagement therewith. This ensures that proper clamping pressures can be maintained between the blow mold segments and also between the blow mold and bottom plate.

Although reference has been made to a specific embodiment or embodiments, it will be apparent to those skilled in the art that various modifications and alterations may be made thereto without departing from the spirit of the present invention. Therefore, it is intended that the scope of this invention can be ascertained by reference to the following claims.

What is claimed is:

1. A delivery system for delivering gobs of glass from a plurality of feeder orifices to a plurality of sets of a plurality of blank molds, said sets being rotated about a central axis with each said blank mold of each set being positioned a different radial distance from said central axis, said delivery system including a plurality of individual gob guiding units, each one feeding a gob from one orifice to one of the blank molds in a set of blank molds, and means mounting said gob guiding units so that the upper ends thereof are substantially under the orifice and the other ends are positioned over the blank molds as each set of blank molds are rotated underneath and the other end of each unit is moved at a different relative tangential velocity to match the different relative tangential velocity of its associated blank mold.

2. For use with a glassware forming machine having a plurality of individual sections with each section having a plurality of blank mold cavities, a delivery system for feeding gobs of glass from a feeder having orifices therein to the blank molds, said delivery ststem including a set of scoops, said set having a plurality of scoops equal in number to the number of blank molds for directing gobs of glass from the feeder toward the blank molds of one section at a given time, said scoops of said set each being moveable between an operative position under the orifice for feeding gobs to said blank molds and an inoperative position wherein said scoops are positioned out of feeding relationship with respect to its associated orifice, means for moving each said scoop between its feeding and inoperative positions, said means enabling at least one of said scoops of said set to be positioned in its inoperative position while at least one of said scoops of said set is positioned in its feeding position.

3. The delivery system of claim 2 wherein said means also enables all of said scoops to be positioned in their inoperative position.

4. The delivery system of claim 2 wherein the delivery system includes a set of troughs equal in number to the number of said blank molds each of said scoops being in alignment with an associated trough in its feeding position, the individual sections of said glassware forming machine are mounted for rotation about a central machine axis whereby said blank mold of each section are successively moved into feeding position in alignment with said delivery system.

5. In the delivery system of claim 2, said means including an individual piston and cylinder mechanism associated with each scoop and operable separately from the others to move its scoop between its inoperative position and its operative position.

* * * * *

UNITED STATES PATENT AND TRADEMARK OFFICE
CERTIFICATE OF CORRECTION

PATENT NO. : 4,417,915
DATED : November 29, 1983
INVENTOR(S) : Francis A. Dahms

It is certified that error appears in the above—identified patent and that said Letters Patent is hereby corrected as shown below:

Col. 1, line 22 - the word "foaming" should read --forming--

Col. 5, line 41 - the word "of" should read --to--

Col. 12, line 58 - the word "uppe" should read --upper--

Col. 18, line 45 - after the word "blowhead" insert the word --arm--

Col. 20, line 30 - the word "operating" should read --opening--

Signed and Sealed this

Fifteenth Day of May 1984

[SEAL]

Attest:

GERALD J. MOSSINGHOFF

Attesting Officer   Commissioner of Patents and Trademarks